United States Patent [19]

Hoshi et al.

[11] Patent Number: 5,173,189
[45] Date of Patent: Dec. 22, 1992

[54] MEMBRANE FOR SEPARATING AN ORGANIC SOLVENT FROM A WATER-ORGANIC SOLVENT MIXTURE

[75] Inventors: Masaru Hoshi, Urawa; Tsutomu Nakagawa, Musashino; Akon Higuchi, Tokyo; Toshio Sugizaki, Urawa, all of Japan

[73] Assignee: Lintec Corporation, Tokyo, Japan

[21] Appl. No.: 714,036

[22] Filed: Jun. 12, 1991

[30] Foreign Application Priority Data

Jun. 14, 1990 [JP] Japan .................. 2-154004
Jun. 3, 1991 [JP] Japan .................. 3-131400

[51] Int. Cl.$^5$ ............................................. B01D 61/36
[52] U.S. Cl. ................................. 210/640; 210/500.35
[58] Field of Search .............. 525/279; 210/638, 640, 210/490, 500.35

[56] References Cited

U.S. PATENT DOCUMENTS 3,723,306  3/1973  Bridgeford .................. 210/638
4,085,168  4/1978  Milkovich et al. ........ 525/279 X

FOREIGN PATENT DOCUMENTS 192893    9/1986   European Pat. Off. .
339502   11/1989   European Pat. Off. .
8500331   2/1986   PCT Int'l Appl. .

*Primary Examiner*—Frank Spear
*Attorney, Agent, or Firm*—Finnegan, Henderson, Farabow, Garrett and Dunner

[57] ABSTRACT

A membrane for the separation of an organic solvent from a water-organic solvent mixture has a polymeric membrane of a copolymer consisting essentially of an α, β-unsaturated carbonyl compound as a main monomer. The α, β-unsaturated carbonyl compound includes an acrylic acid ester or a methacrylic acid ester. The polymeric membrane has a crosslinked structure. The polymeric membrane is carried on a support member in the form of a flat membrane, a pipe or a hollow fiber. The polymeric member includes particles therein. The polymeric membrane is sandwiched by the support members to form a composite-type separation membrane. The composite-type separation membrane is modulated.

21 Claims, 26 Drawing Sheets

MEMBRANE FOR SEPARATING AN ORGANIC SOLVENT FROM A WATER-ORGANIC SOLVENT MIXTURE

BACKGROUND OF THE INVENTION

1. Field of the Invention

The present invention relates to a membrane for separating a water-organic solvent (hereafter, referred to as "a water-organic solvent separation membrane") and more particularly to a separation membrane for efficiently permeating and separating an organic solvent from a water-organic solvent mixture to purify the water or concentrate and recover the organic solvent.

2. Description of the Prior Art

Utilization of membranes in the step of separation and purification of gases or fluids has recently been increasing. This is not only because the use of membranes makes it possible to carry out the separation with less energy than is required by conventional separation techniques such as distillation but also because it gives an expectation that substances susceptible to thermal denaturation when separated by distillation, azeotropic mixtures or isomers can be subjected to separation.

Examples of utilizing separating membranes currently put into practice include preparation of an ultrapure water or freshening of seawater using a reverse osmosis membrane, artificial dialysis using an ultrafiltration membrane, application to food industry such as separation of beer yeast, oxygen enrichment using an oxygen-enriching membrane for combustion or medical treatment.

Although membranes for use in dehydration from various water-organic solvent mixtures such as water-alcohol have been put into practical use, those membranes for separating organic solvents from mixtures containing organic solvents in low concentrations have not yet reached into a stage of practical use. However, once the separation of organic solvents from mixtures containing organic solvents in low concentrations is made possible, it is useful for the separation of organic solvents, i.e., substances contained in industrial waste water or underground water and causing environmental pollution, substances harmful to humans, substances which can be recovered and reused, or substances which are objective substances.

For selective permeation or separation of organic solvents from water-organic solvent mixtures, it is sufficient to use membrane materials having affinity higher for organic solvents than water. Separation of water-alcohol or the like has been studied using various membrane materials such as a polydimethylsiloxane membrane, a membrane of a polydimethylsiloxane containing zeolite silica, a polystyrene/polyfluoroalkylate copolymer membrane, and a poly(1-trimethylsilyl-1-propyne) membrane currently considered to have the highest permeability to gases. However, the poly(1-trimethylsilyl-1-propyne) membrane is practically unsatisfactory because it has a separation factor on the order of about 5 to 40. On the other hand, polydimethylsiloxane has a low mechanical strength and therefore is difficult to be formed as a thin film. Thus, no separation membrane has hitherto been obtained that has a high separability for organic solvents.

Examples of the techniques used in the separation of fluids include a pervaporation method. This method is useful as a technique for separating azeotropic mixtures or mixtures of substances having boiling points close to each other that have been heretofore not easily be separated by distillation or the like.

The membrane currently put into practical use in the pervaporation method would be only a polyvinyl alcohol-based composite membrane developed by GFT AG of former West Germany. It is used for the dehydration of azeotropic mixtures such as water-alcohol. However, no membrane for selective separation of organic solvents has been known that has a performance enough to separate an alcohol from an alcohol solution in a low concentration obtained as a result of fermentation or the like.

No membrane has been developed yet that has a performance enough to recover organic solvents which are contained in industrial waste water or underground water. When a distillation method is used for separating organic solvents from stock solutions containing organic solvents having boiling points higher than water in low concentrations, much energy will be required. Also, if adsorption, extraction or the like is utilized, a step of isolating organic solvents will be necessary after the treatment concerned.

Hence, there is a demand for development of a separation membrane for selectively separating organic solvents for use in pervaporation methods, which are advantageous over other separation methods.

SUMMARY OF THE INVENTION

Accordingly, it is an object of the present invention to obviate problems encountered by the conventional separation membranes and provide a separation membrane for the selective permeation and separation of organic solvents from water-organic solvent mixtures.

The foregoing and other objects of the present invention can effectively be achieved by providing a separation membrane for the separation of water-organic solvent which comprises a polymeric membrane of a copolymer consisting essentially of an $\alpha,\beta$-unsaturated carbonyl compound as a main monomer.

Here, the $\alpha,\beta$-unsaturated carbonyl compound may be an acrylic acid ester or a methacrylic acid ester.

Also, the copolymer may have a reactive functional group which can be crosslinked with a crosslinking agent.

The reactive functional group of the copolymer may be selected from the group consisting of a carboxyl group, a hydroxyl group, a glycidyl group and an amino group.

The crosslinking agent may be selected from the group consisting of a polyisocyanate, a melamine resin, an epoxy resin, a metal chelate, a polyvalent metal and a polyamine.

The membrane may have a support member for supporting the polymeric membrane. The support member may be in the form of a flat membrane.

The polymeric membrane may be arranged on the surface of at least one pipe as the support member. The pipe may be a concentric cylinder.

The polymeric membrane may be coated on the surface of hollow fibers as the support member.

The support member may be supported on a porous membrane.

The polymeric membrane may include particles therein.

The polymeric membrane may be supported on a porous member.

A composite-type separation membrane for separating an organic solvent from a water-organic solvent mixture, comprises a polymeric membrane of copolymer consisting essentially of an $\alpha,\beta$-unsaturated carbonyl compound as a main monomer; and at least one support member which is arranged on the polymeric membrane.

With the separation membrane of the present invention being principally constructed such that a film of an acrylate or methacrylate/acrylic acid copolymer is formed on a substrate such as a porous membrane, it is possible to selectively permeate organic solvents from water-organic solvent mixtures to efficiently separate organic solvent from water. Even when the contents of organic solvents in the water-organic solvent mixtures are small, the use of the separation membrane of the present invention enables selective permeation of the organic solvents, thus giving processed liquids containing organic solvents in high concentrations.

The above and other objects, effects, features and advantages of the present invention will become more apparent from the following description of embodiments thereof taken in conjunction with the accompanying drawings.

BRIEF DESCRIPTION OF THE ACCOMPANYING DRAWINGS

Figure 6:
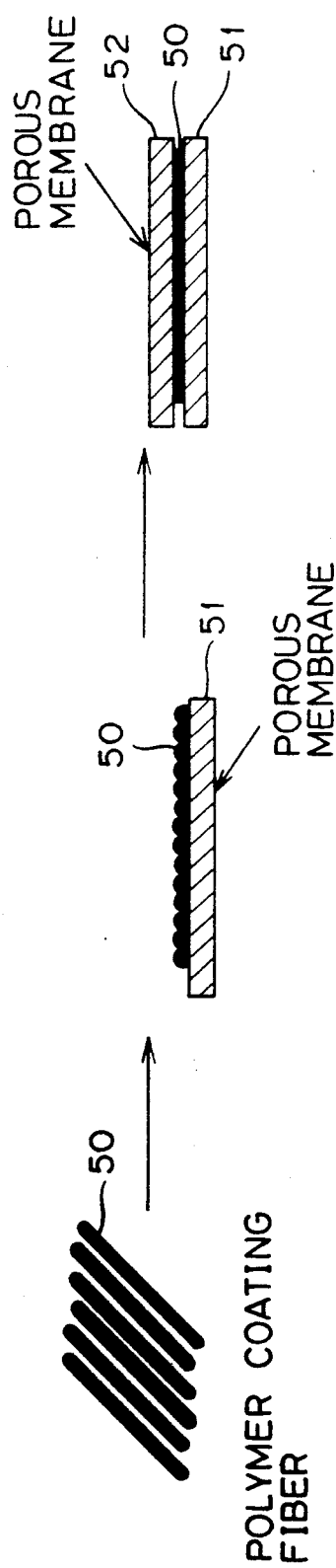
Figure 7:
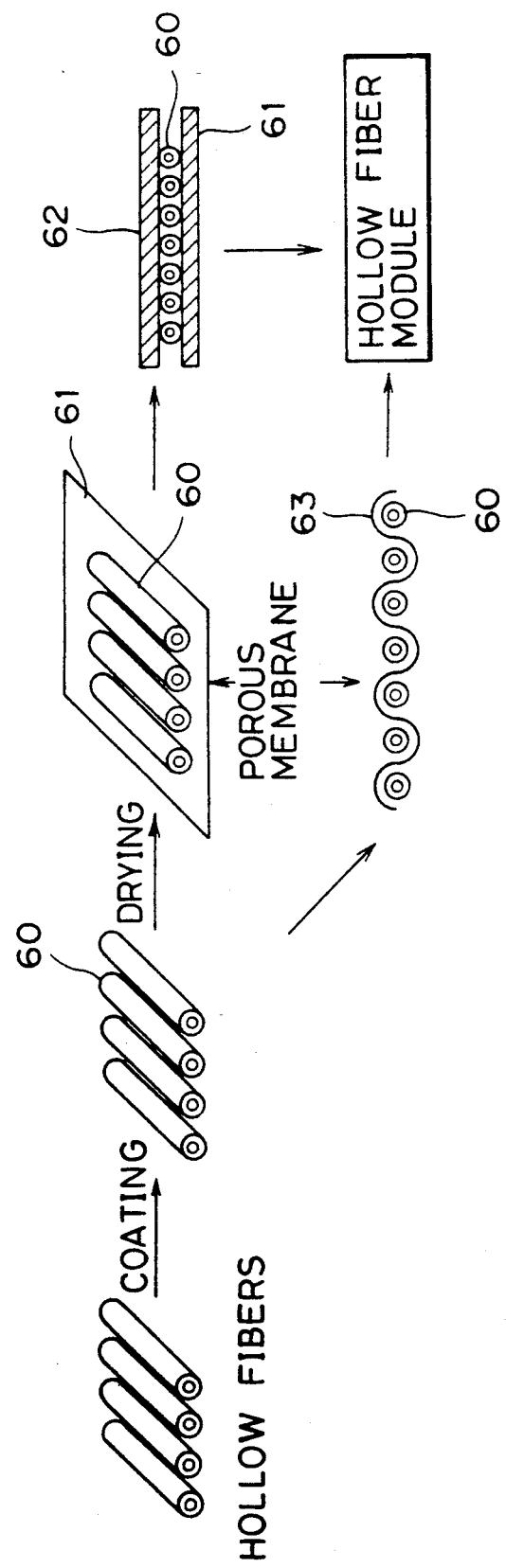
Figure 8:
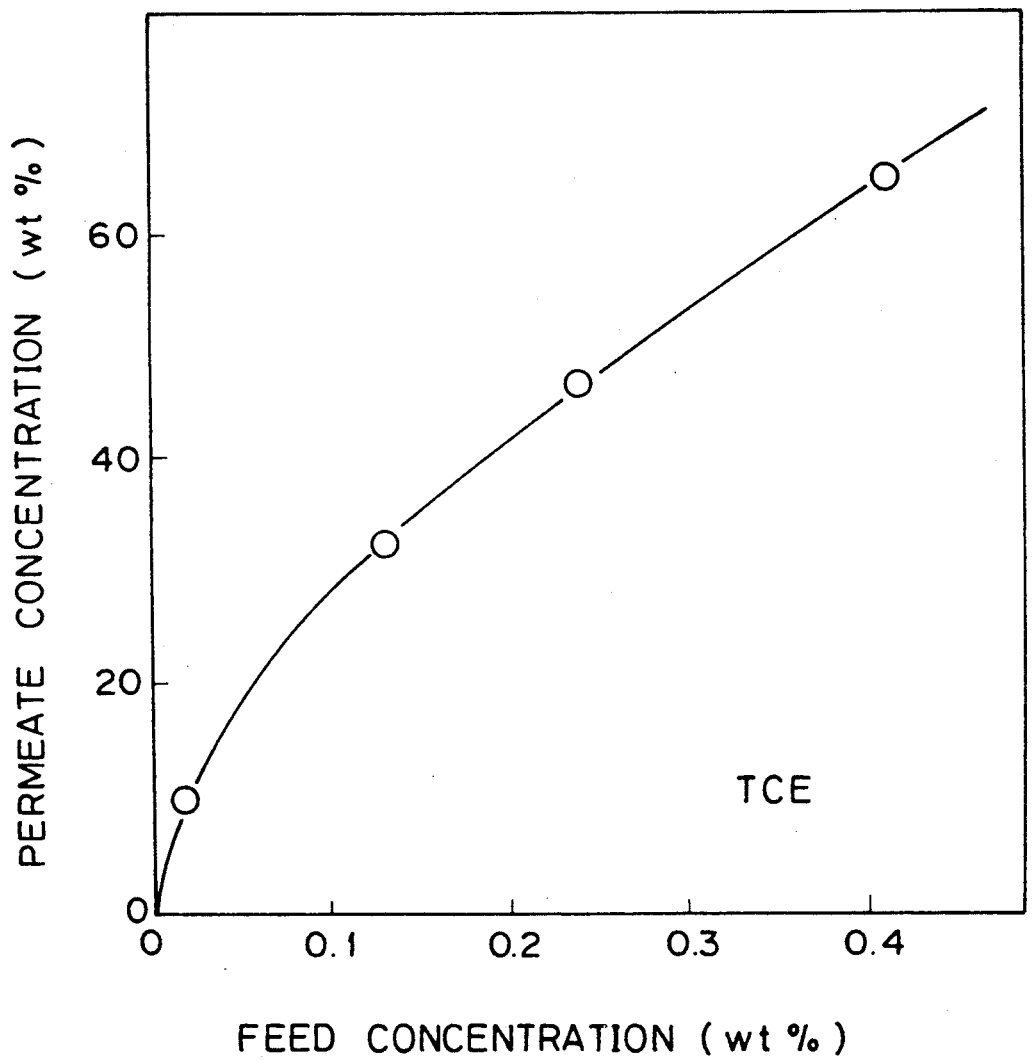
Figure 9:
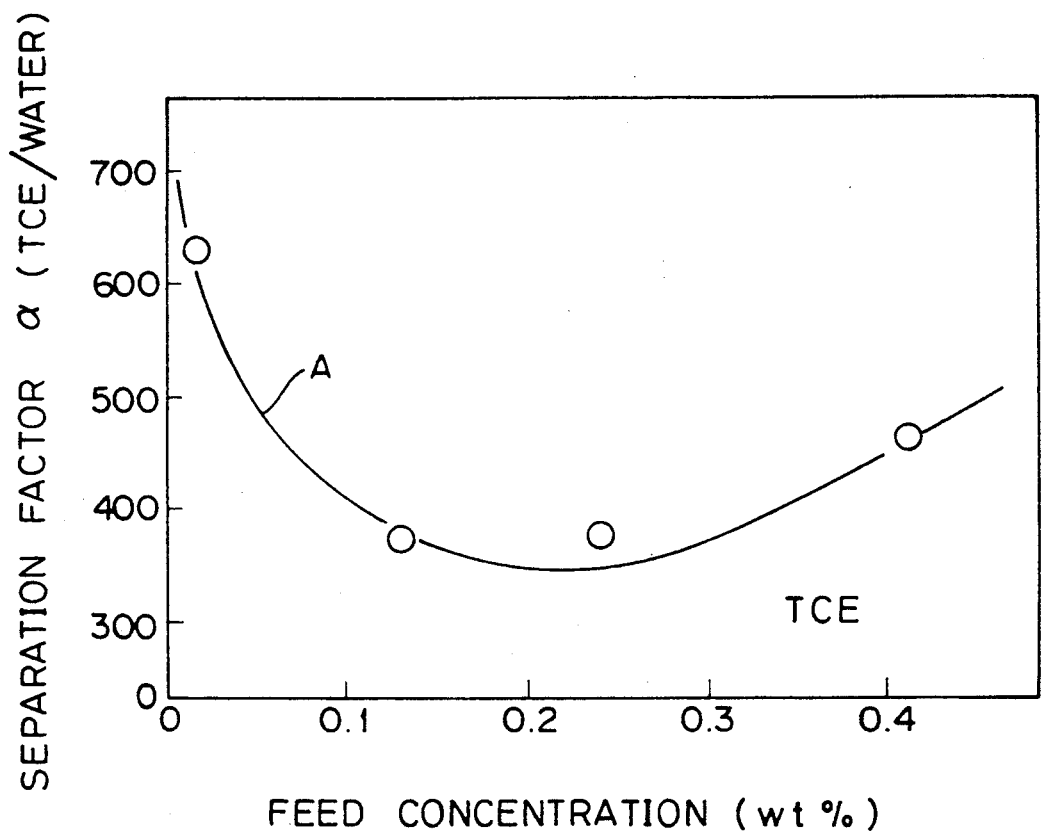
Figure 10:
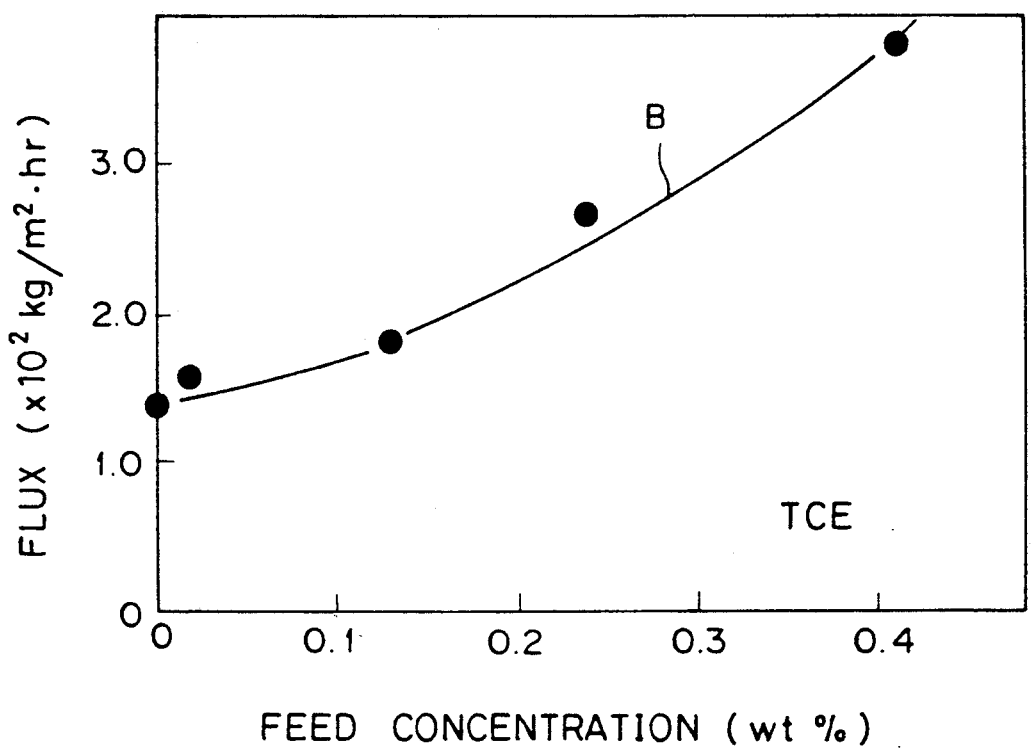
Figure 11:
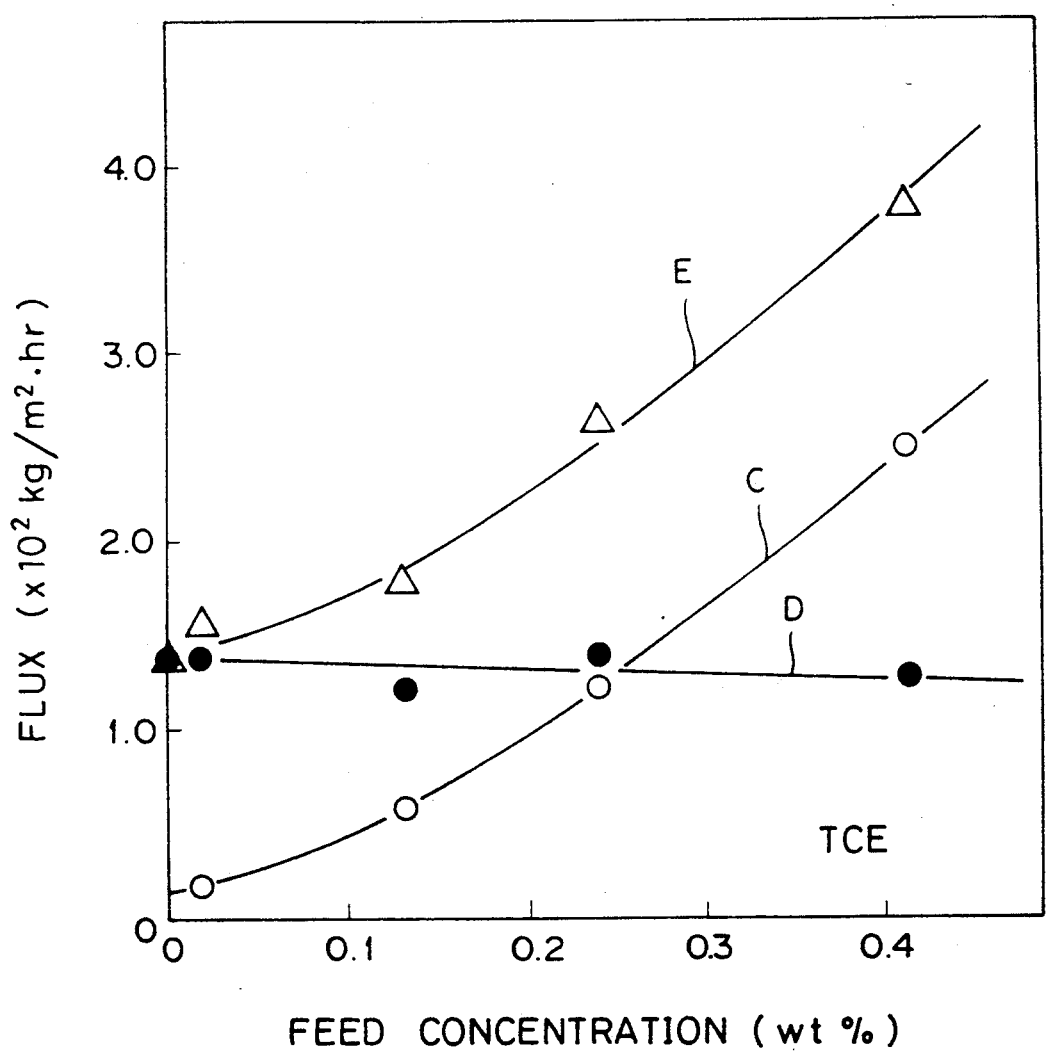
Figure 12:
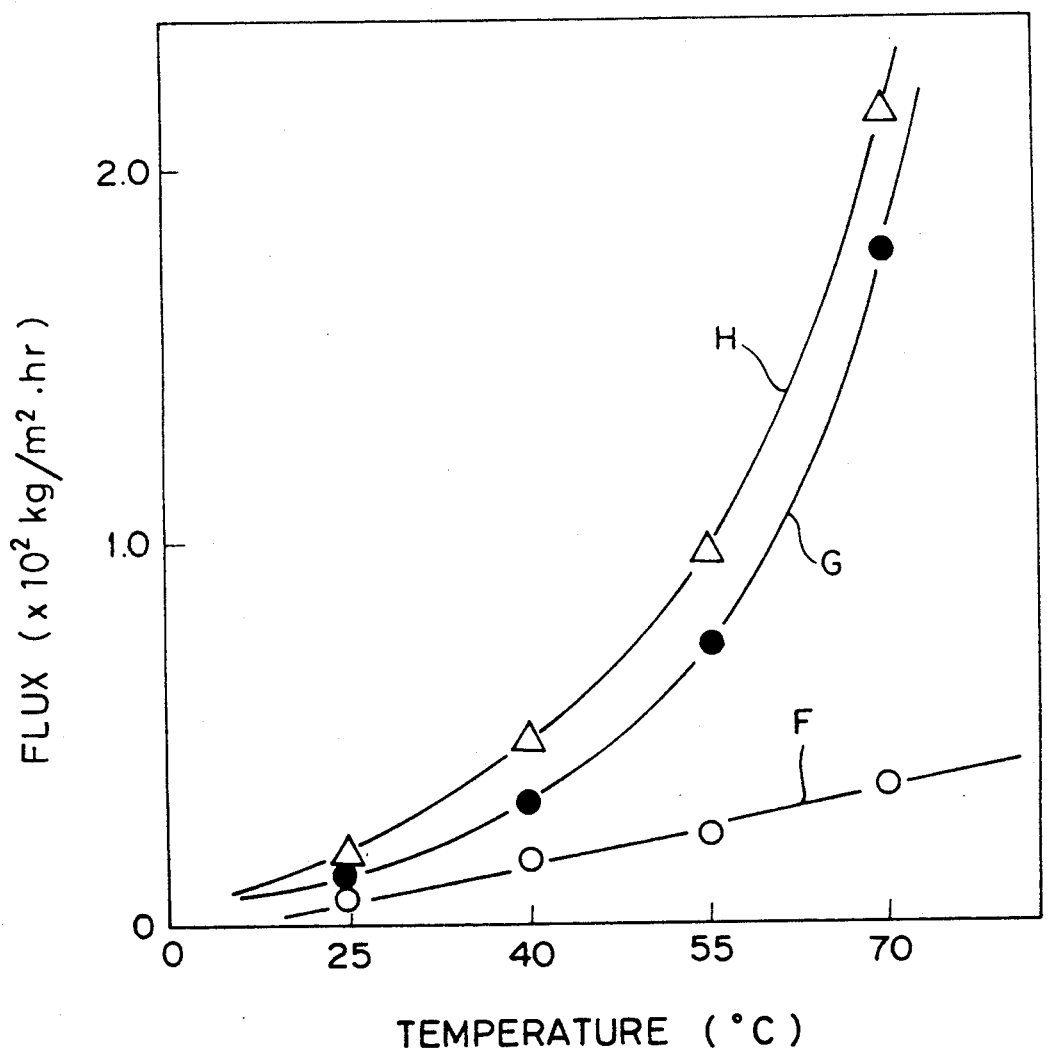
Figure 13:
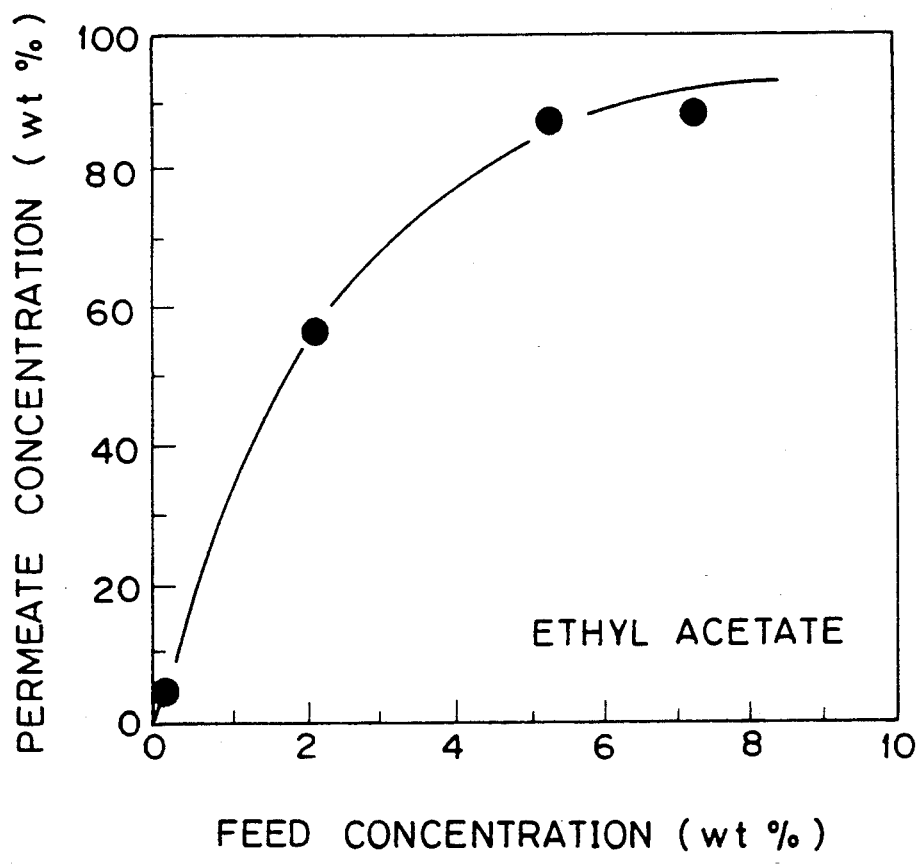
Figure 14:
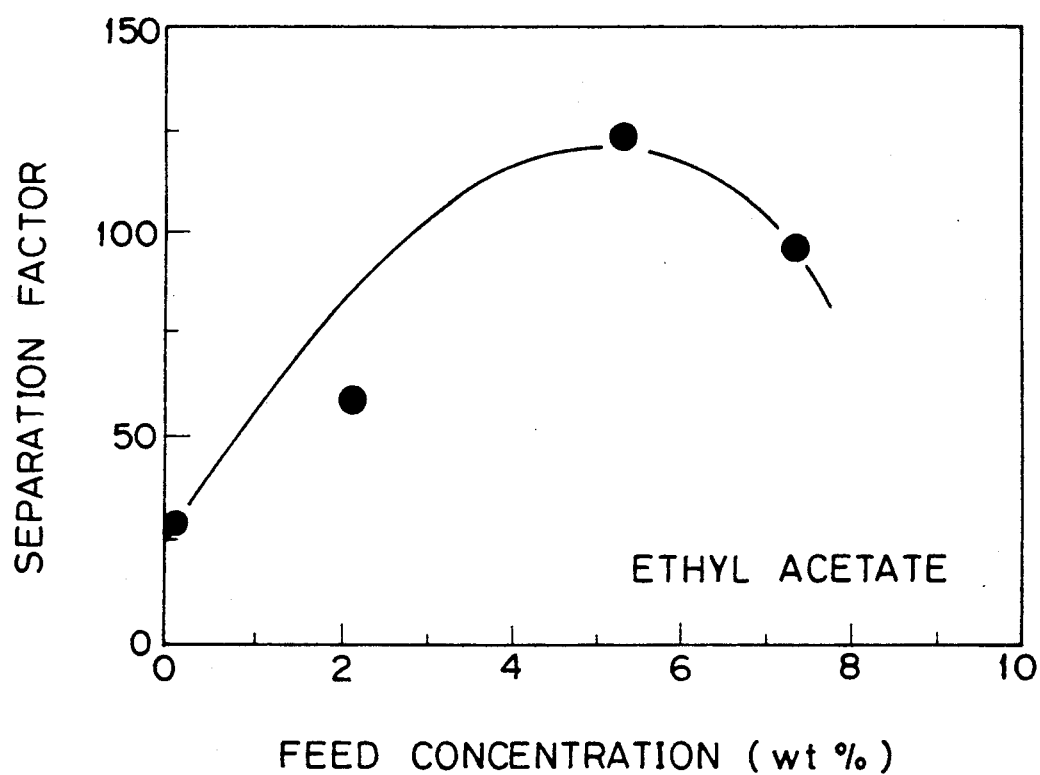
Figure 15:
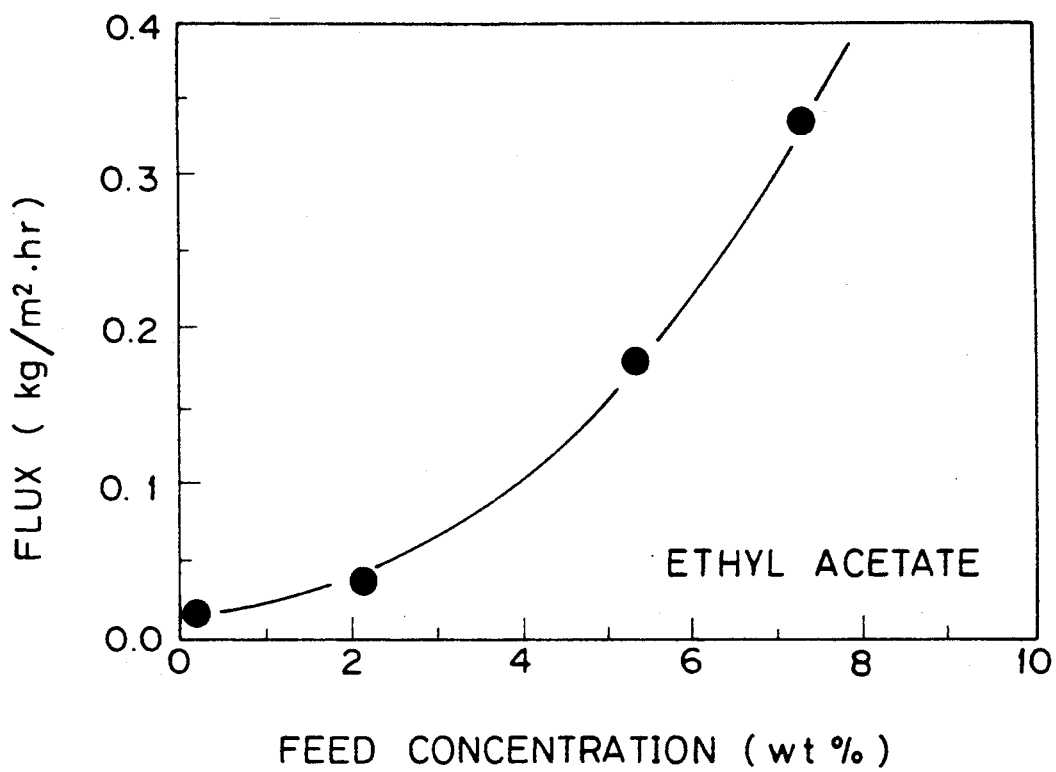
Figure 16:
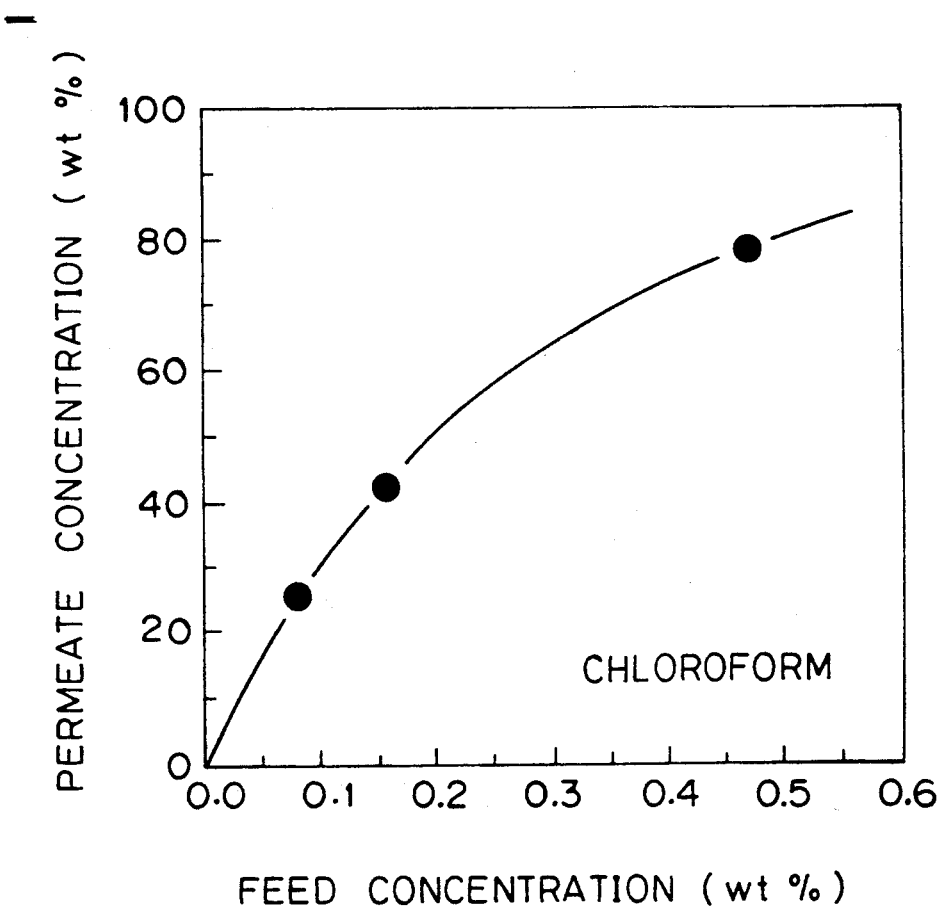
Figure 17:
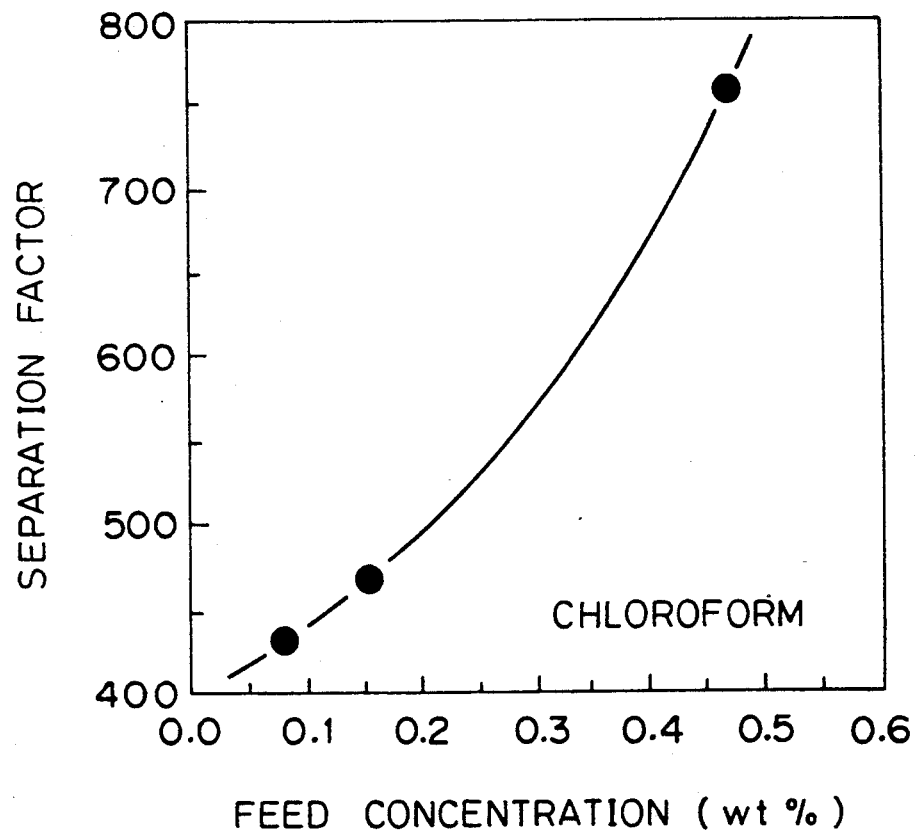
Figure 18:
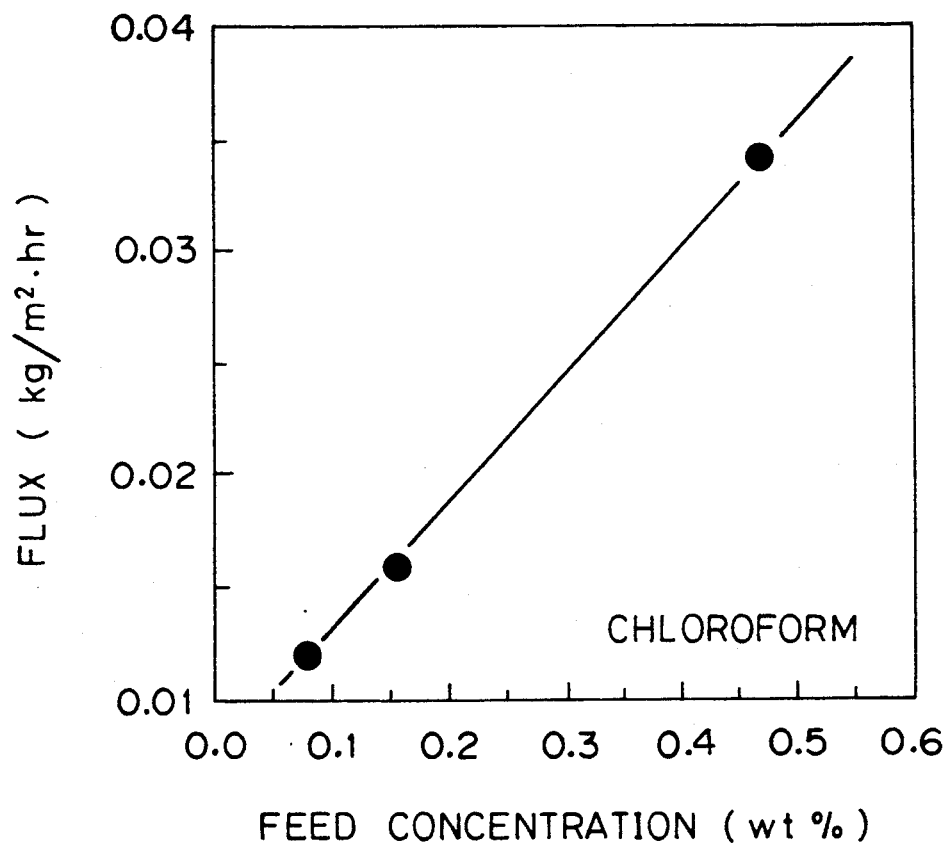
Figure 19:
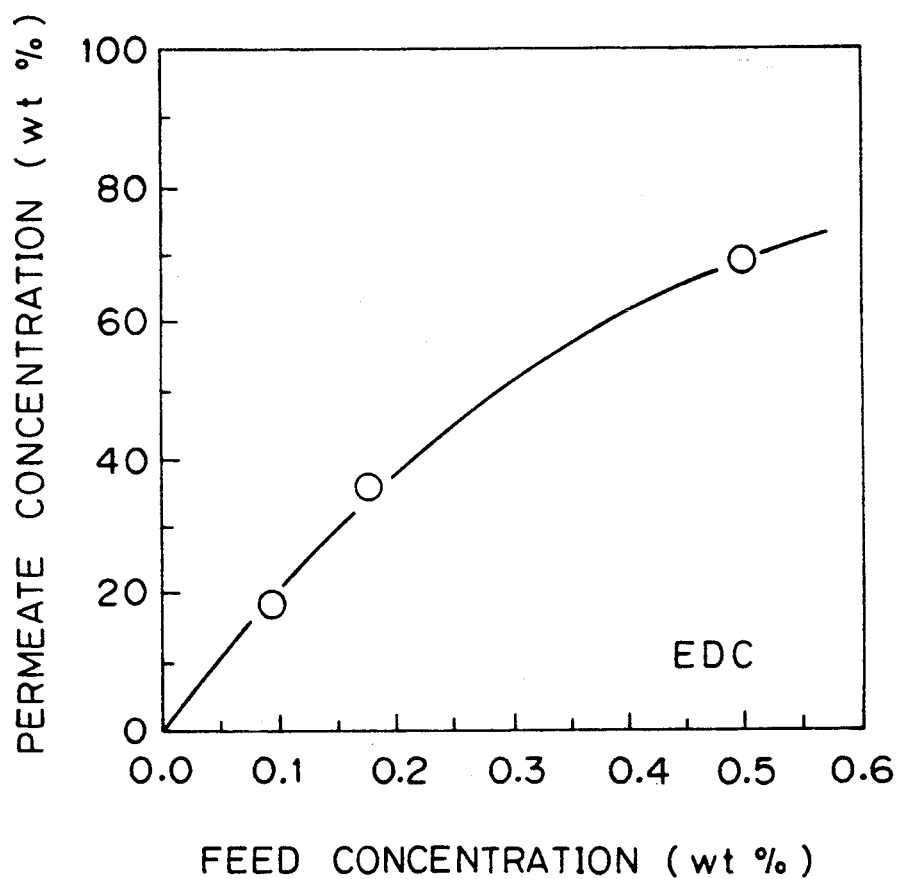
Figure 20:
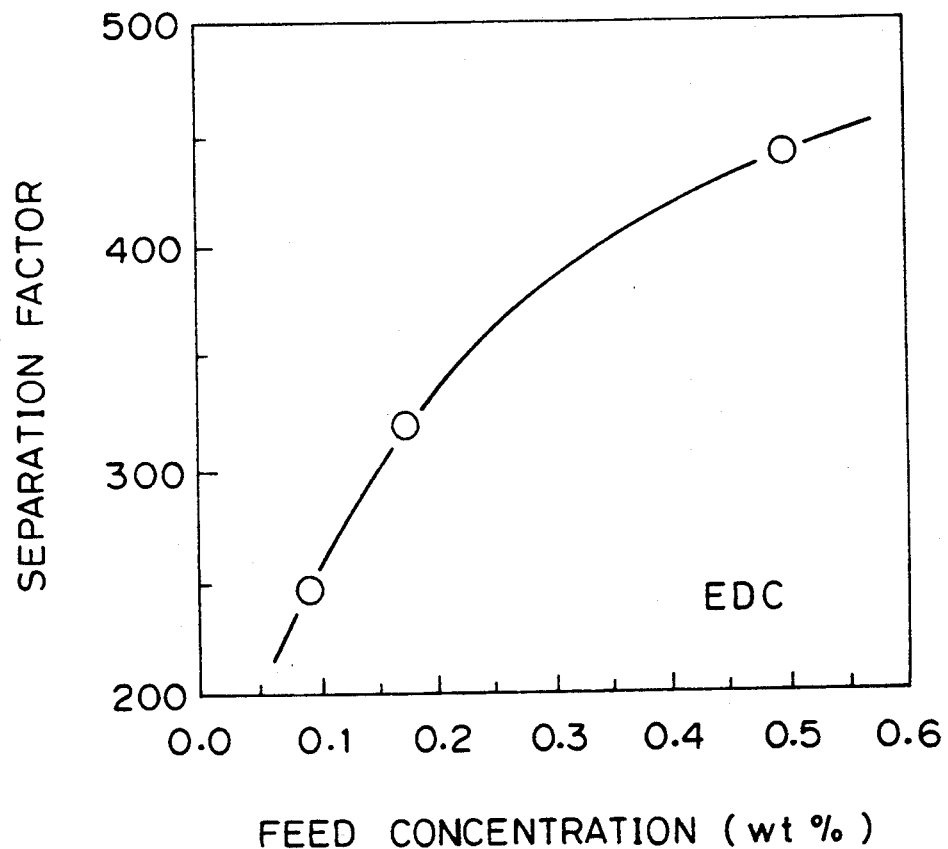
Figure 21:
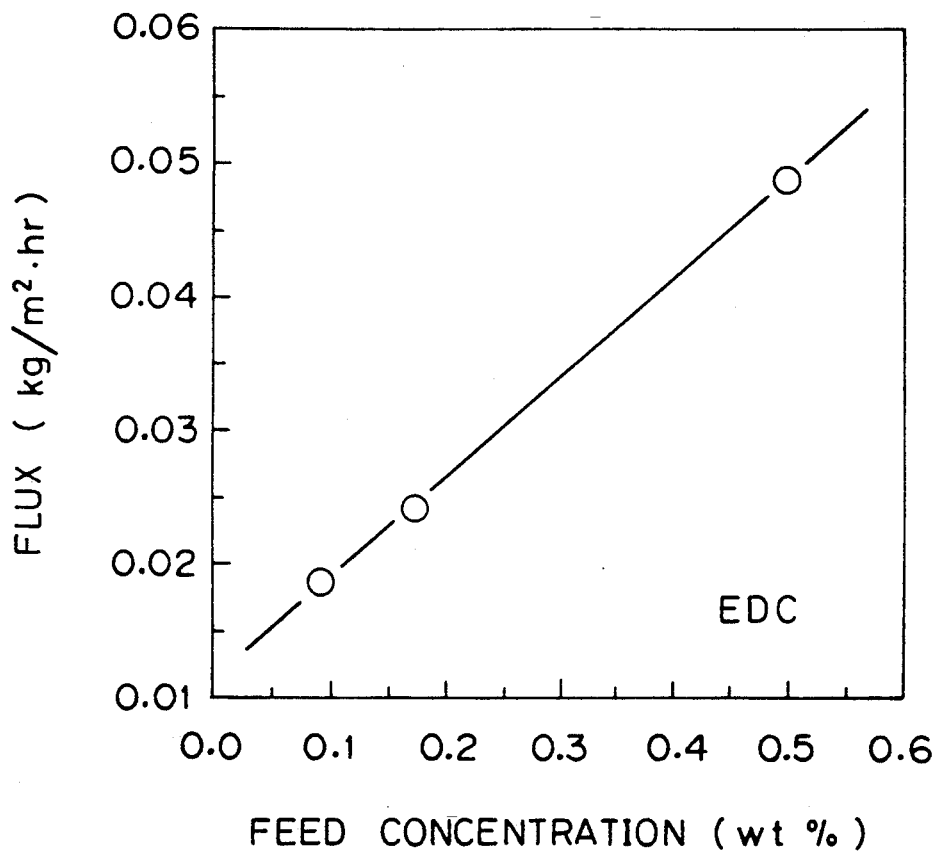
Figure 22:
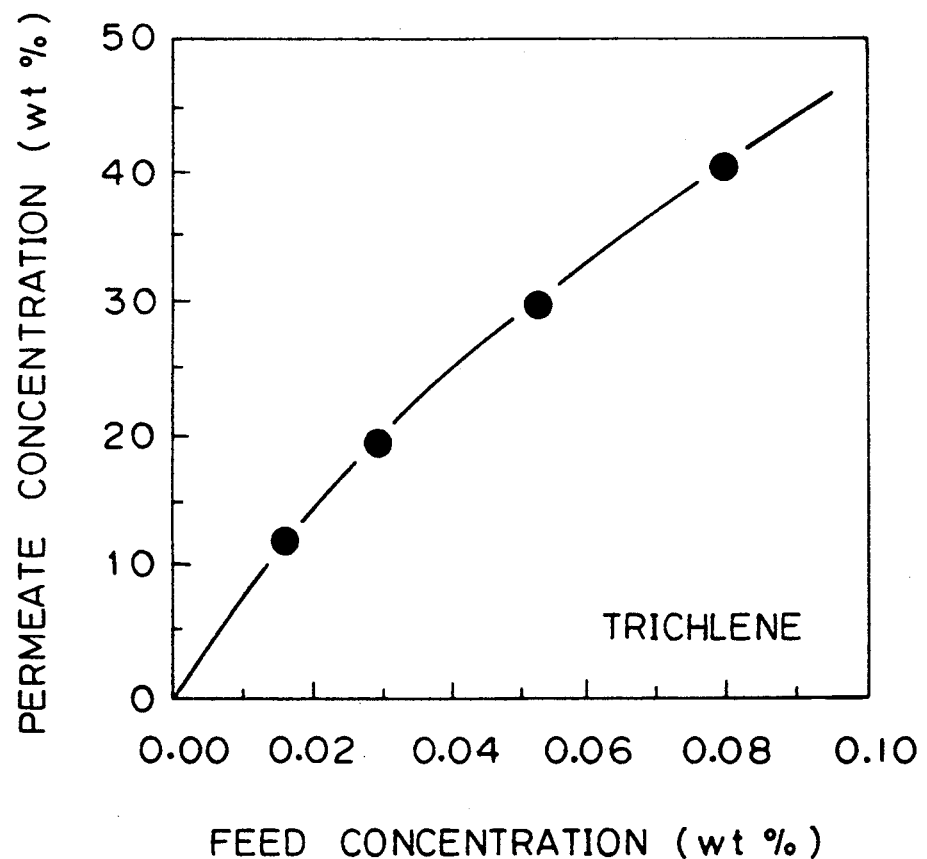
Figure 23:
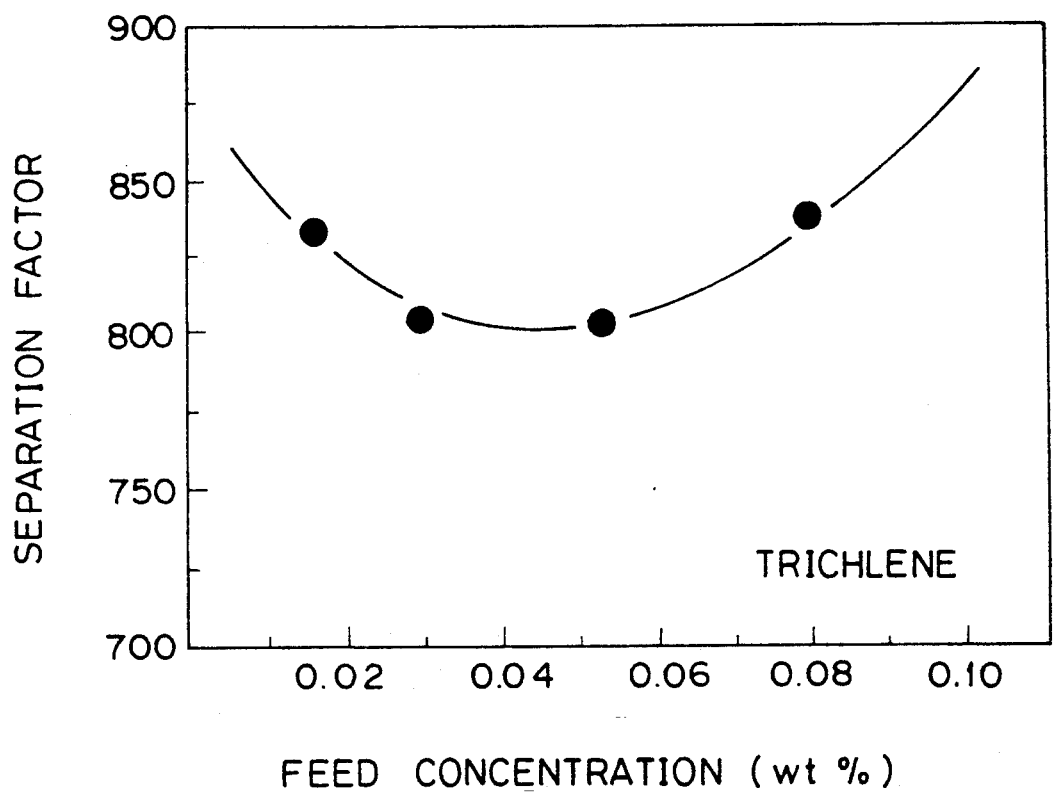
Figure 24:
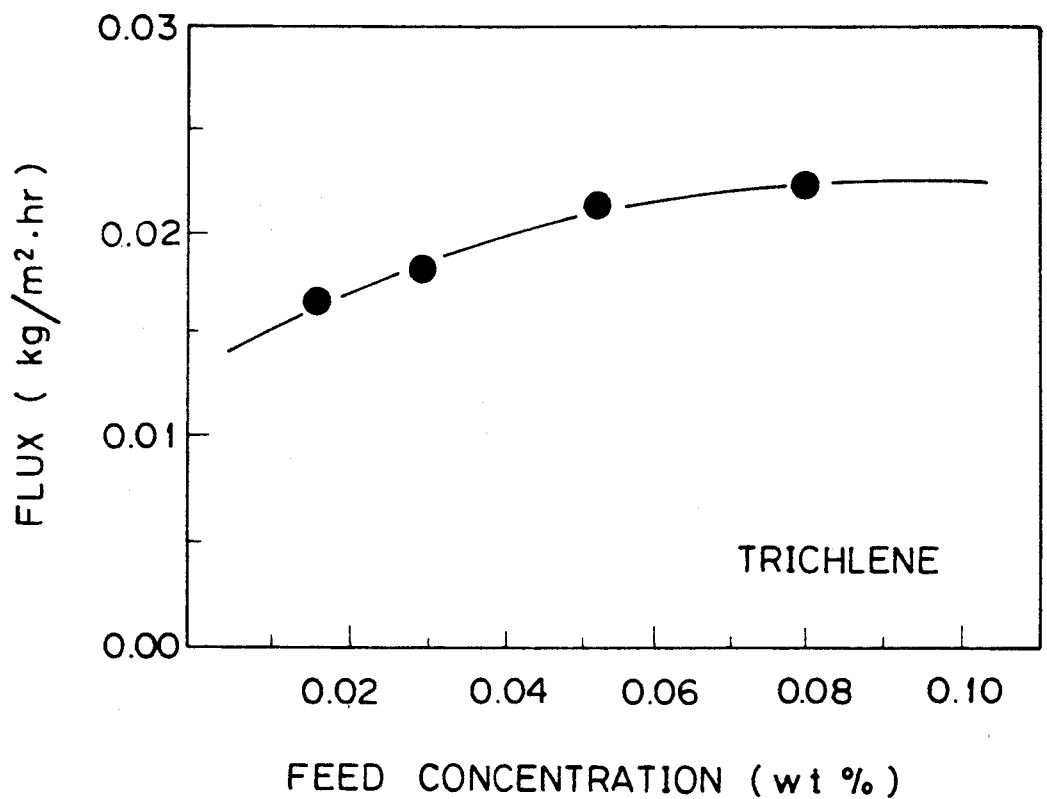
Figure 25:
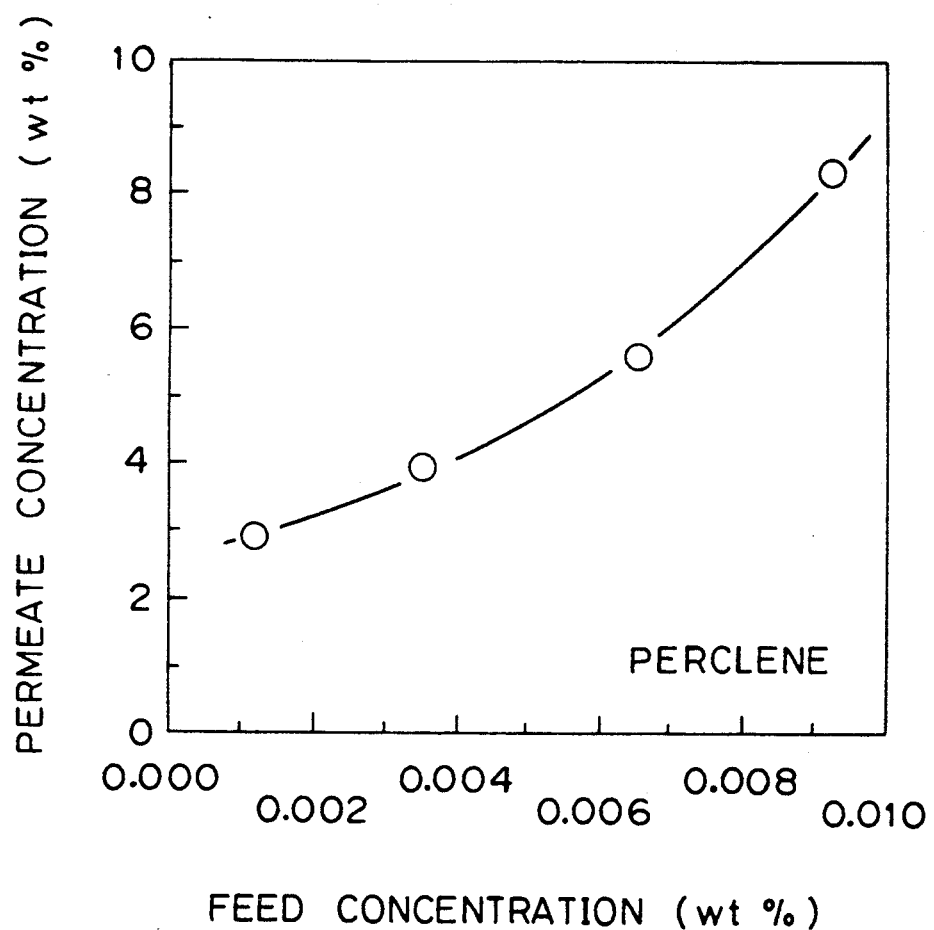
Figure 26:
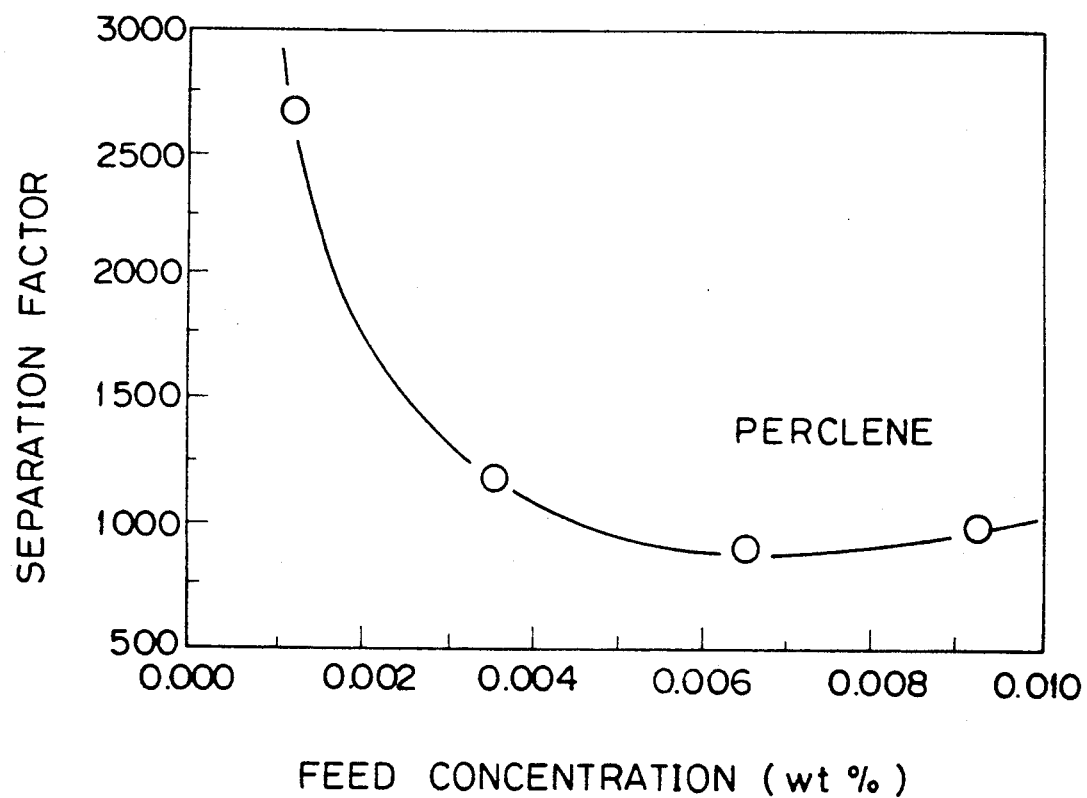
Figure 27:
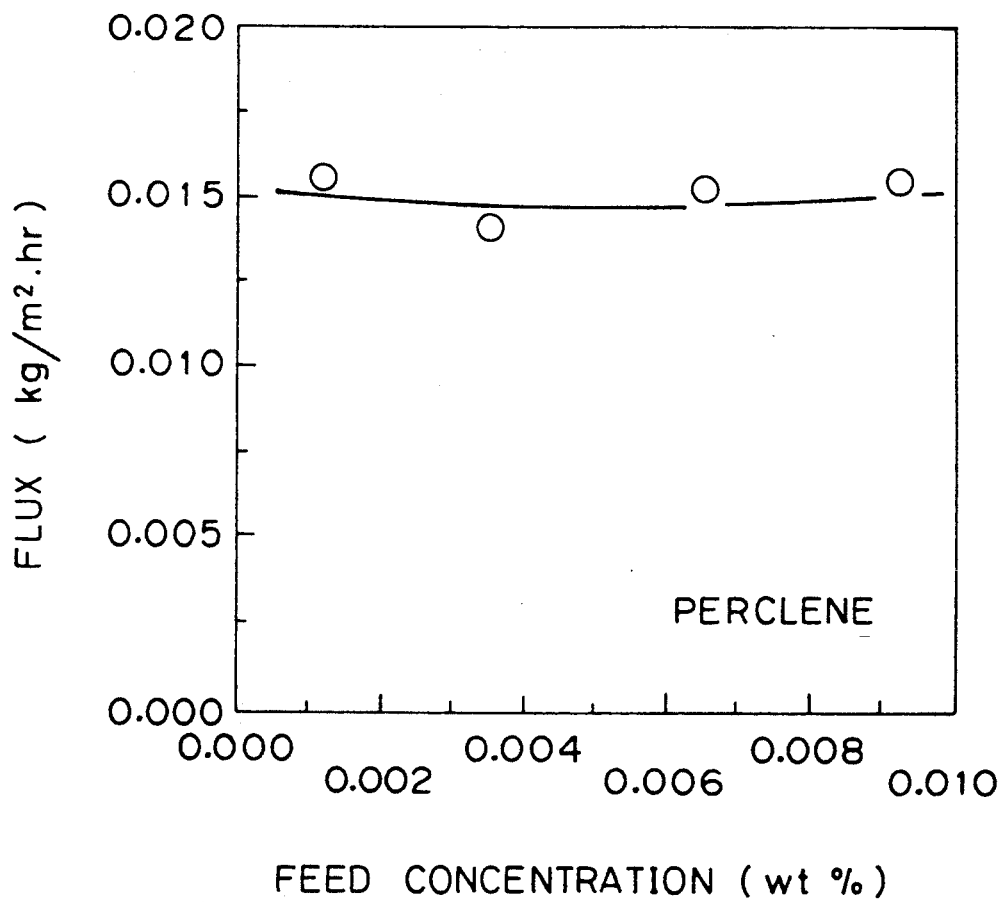

FIGS. 6A to 6C are cross-sectional views each showing a procedure of producing a composite-type separation membrane according to the present invention having a polymeric membrane, fibers which are coated with the polymeric membrane, and porous membranes for sandwiching the fibers therebetween; when fibers are used as a substrate for carrying a FIGS. 7A to 7E are explanatory diagrams each showing a procedure of producing a composite-type separation membrane according to the present invention having a polymeric membrane, hollow fibers which are coated with the polymeric membrane, and a pair of flat porous membranes for sandwiching the hollow fibers therebetween;

FIG. 7F is an explanatory diagram showing a construction of the composite-type separation membrane in which the hollow fibers are supported by a corrugated porous membrane instead of the flat porous membranes as shown in FIGS. 7C and 7D;

FIG. 8 is a graph illustrating a relationship between a concentration of 1,1,2-trichloro ethane ("TCE") in a feed liquid and a concentration of TCE in the permeate liquid in the separation of an organic solvent from a water-organic solvent mixture by the pervaporation method using an embodiment of the water-organic solvent separation membrane according to the present invention;

FIG. 9 is a graph illustrating a relationship between a concentration of TCE in a feed liquid and a separation factor of TCE for water in the separation of TCE from a water-TCE mixture by the pervaporation method using the embodiment of the water-organic solvent separation membrane;

FIG. 10 is a graph illustrating a relationship between a concentration of TCE in a feed liquid and a flux used in the separation of TCE from a water-TCE mixture by the pervaporation method using the embodiment of the water-organic solvent separation membrane;

FIG. 11 is a graph illustrating a relationship between a concentration of TCE in a feed liquid and a flux of TCE, that of water, and total of flux used in the separation of TCE from a water-TCE mixture by the pervaporation method using the embodiment of the water-organic solvent separation membrane;

FIG. 12 is a graph illustrating the temperature dependence of a flux of TCE, that of water, and total of flux used in the separation of TCE from a water-TCE mixture by the pervaporation method using the embodiment of the water-organic solvent separation membrane;

FIG. 13 is a graph illustrating a relationship between a concentration of ethyl acetate in the feed liquid and a concentration of ethyl acetate in a permeate liquid in the separation of ethyl acetate from a water-ethyl acetate mixture by the pervaporation method using the embodiment of the water-organic solvent separation membrane;

FIG. 14 is a graph illustrating a relationship between a concentration of ethyl acetate in a feed liquid and a separation factor of ethyl acetate for water in the separation illustrated in FIG. 13;

FIG. 15 is a graph illustrating a relationship between a concentration of ethyl acetate in the feed liquid and the flux used in the separation illustrated in FIG. 13;

FIG. 16 is a graph illustrating a relationship between a concentration of chloroform in a feed liquid and a concentration of chloroform in a permeate liquid in the separation of chloroform from a water-chloroform mixture by the pervaporation method using the embodiment of the water-organic solvent separation membrane;

FIG. 17 is a graph illustrating a relationship between a concentration of chloroform in a feed liquid and a separation factor of chloroform for water in the separation illustrated in FIG. 16;

FIG. 18 is a graph illustrating a relationship between a concentration of chloroform in a feed liquid and a flux used in the separation illustrated in FIG. 16;

FIG. 19 is a graph illustrating a relationship between a concentration of ethylene dichloride ("EDC") in a feed liquid and a concentration of EDC in a permeate liquid in the separation of EDC from a water-EDC mixture by the pervaporation method using the embodiment of the water-organic solvent separation membrane;

FIG. 20 is a graph illustrating a relationship between a concentration of EDC in a feed liquid and a separation factor of EDC for water in the separation illustrated in FIG. 19;

FIG. 21 is a graph illustrating a relationship between a concentration of EDC in a feed liquid and a flux used in the separation illustrated in FIG. 19;

FIG. 22 is a graph illustrating a relationship between a concentration of trichlene in a feed liquid and a concentration of trichlene in a permeate liquid in the separation of trichlene from a water-trichlene mixture by the pervaporation method using the embodiment of the water-organic solvent separation membrane;

FIG. 23 is a graph illustrating a relationship between a concentration of trichlene in a feed liquid and a separation factor of trichlene for water in the separation illustrated in FIG. 22;

FIG. 24 is a graph illustrating a relationship between a concentration of trichlene in a feed liquid and a flux used in the separation illustrated in FIG. 22;

FIG. 25 is a graph illustrating a relationship between a concentration of perclene in a feed liquid and a concentration of perclene in a permeate liquid in the separation of perclene from a water-perclene mixture by the pervaporation method using the embodiment of the water-organic solvent separation membrane;

FIG. 26 is a graph illustrating a relationship between a concentration of perclene in a feed liquid and a separation factor of perclene for water in the separation illustrated in FIG. 25; and FIG. 27 is a graph illustrating a relationship between a concentration of perclene in a feed liquid and a flux used in the separation illustrated in FIG. 25.

DESCRIPTION OF THE PREFERRED EMBODIMENTS

Figure 1:
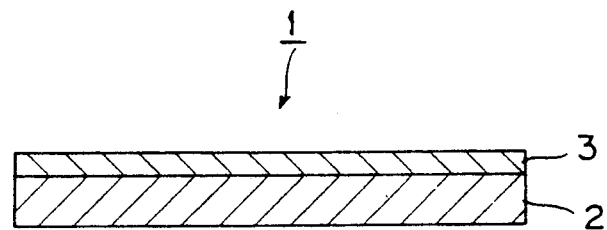
FIG. 1 is a schematic cross-sectional view showing one embodiment of a water-organic solvent separation membrane according to the present invention.

FIG. 1 is a schematic cross-sectional view showing a water-organic solvent separation membrane according to one embodiment of the present invention. In FIG. 1, reference numeral 1 denotes a water-organic solvent separation membrane (hereafter, simply referred to as "separation membrane") structure. The separation membrane structure 1 includes a support member 2 in the form of a flat membrane and a polymeric membrane 3 which is provided on one of surfaces the support member 2 as by coating.

The support member 2 is a porous membrane in the form of a flat membrane in the present embodiment. In this embodiment, the polymeric membrane 3 is made of a copolymer of an acrylic acid ester or a methacrylic acid ester.

Figure 2:
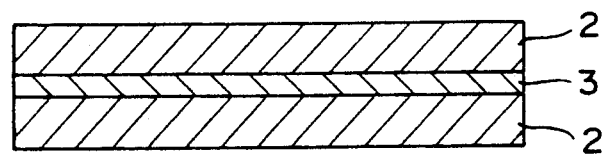
FIG. 2 is a schematic cross-sectional view showing one embodiment of a water-organic solvent separation membrane according to the present invention.

An exposed surface of the polymeric membrane 3 of the separation membrane structure 1 shown in FIG. 1 may be protected by another support member 2. In this case, as shown in FIG. 2, the separation membrane structure 1 having a sandwiched structure includes a polymeric membrane 3 and two support members 2 each being in the form of a flat membrane for protecting opposite surfaces of the polymeric membrane 3.

Here, examples of the acrylic acid ester or methacrylic acid ester used for the production of the separation membrane of the present invention include those having a hydrocarbon-based group which has a high affinity for a specific organic solvent such as an n-butyl group, a tert-butyl group, a benzyl group, or a dodecyl group in the side chain thereof. The aforementioned copolymers can be obtained by radical polymerization of a monomer having the above-described hydrocarbon-based group with acrylic acid in ethyl acetate or a mixed solvent of toluene-ethyl acetate (for example, in a weight proportion of toluene: ethyl acetate=1:20) at 70° C. for 7 to 8 hours using azobisisobutyronitrile as a polymerization initiator. The resulting copolymer, to which a crosslinking agent having a functional group reactive with a carboxyl group may be added, if desired, for example, in the case where the copolymer must have a sufficient durability as a separation membrane or for some other reasons, can be applied onto the substrate such as a porous membrane using a technique of coating, for example, to obtain a separation membrane.

Here, crosslinking agents useful in the application to the aforementioned copolymers includes tetraglycidyl metaxylenediamine (TGXDA) and the like. Also, crosslinking agents such as a polyisocyanate, a melamine resin, an epoxy resin, a metal chelate, a polyvalent metal or a polyamine can be used for those polymers having a reactive functional group such as a carboxyl group, a hydroxyl group, a glycidyl group or an amino group.

A pervaporation method is used for the separation of water-organic solvent mixtures. This method is known as a useful means for separating mixtures of substances having boiling points close to each other, azeotropic mixtures, isomers or the like. According to the method, separation is carried out by providing a separation membrane, by feeding a liquid to be separated on one side of the membrane, by evacuating the other side of the membrane by aspiration to have a component permeated through the membrane, and by collecting the permeate component using a cold trap.

The degree of separation of a substance is indicated generally using a separation factor ($\alpha$) as follows. That is, assuming component A is a substance to be held unpermeated and component B is a substance to be permeated, and $\alpha_{B/A}$ is the separation factor of the component B, the separation factor ($\alpha$) can be defined as a value obtained by division of a proportion of the concentration of the component A or substance A to the concentration of the component B or substance B in a permeate composition by a corresponding proportion in a feed composition to be separated. The unit of concentration may be either % by weight or molar proportion.

$$\alpha_{B/A} = \frac{Y_B/Y_A}{X_B/X_A} \quad (1)$$

wherein $X_A$ and $X_B$ denote the concentrations of the respective components A and B, respectively, on the feed side; and $Y_A$ and $Y_B$ denote the concentrations of the respective components A and B on the permeate side.

Alternatively, the permeability of a substance can be expressed in terms of "flux", and "permeation rate" as a value for indicating permeability showing the performance of the material itself obtained by correcting "flux" by multiplying the flux by the thickness of the membrane.

$$\text{Flux (kg/m}^2 \cdot \text{hr)} = \frac{\text{Weight of Sample (kg)}}{\text{Area for Permeation (m}^2) \times \text{Measuring Time (hr)}} \quad (2)$$

$$\text{Permeation Rate (kg} \cdot \text{m/m}^2 \cdot \text{hr)} = \quad (3)$$

$$\text{Flux (kg/m}^2 \cdot \text{hr)} \times \text{Thickness of Membrane (m)}$$

The larger the separation factor ($\alpha$) and the permeation rate, the more excellent the performance of the membrane material. The greater the product of the separation factor ($\alpha$) and the permeation rate, the more excellent the performance of the membrane.

The separation membrane of the present invention has a separation factor ($\alpha$) of from several tens to several thousands and a permeation rate of from $10^{-5}$ to $10^{-6}$ (kg·m/m$^2$·hr), thus showing that it is useful for separating or recovering organic solvents from water-organic solvent mixtures. This would be considered to be ascribable to the fact that the acrylic acid ester or the like used as the $\alpha,\beta$-unsaturated carbonyl compound for film formation has higher affinity for organic solvents than for water.

Next, the present invention will be explained in more detail by way of its embodiments.

Figure 3:
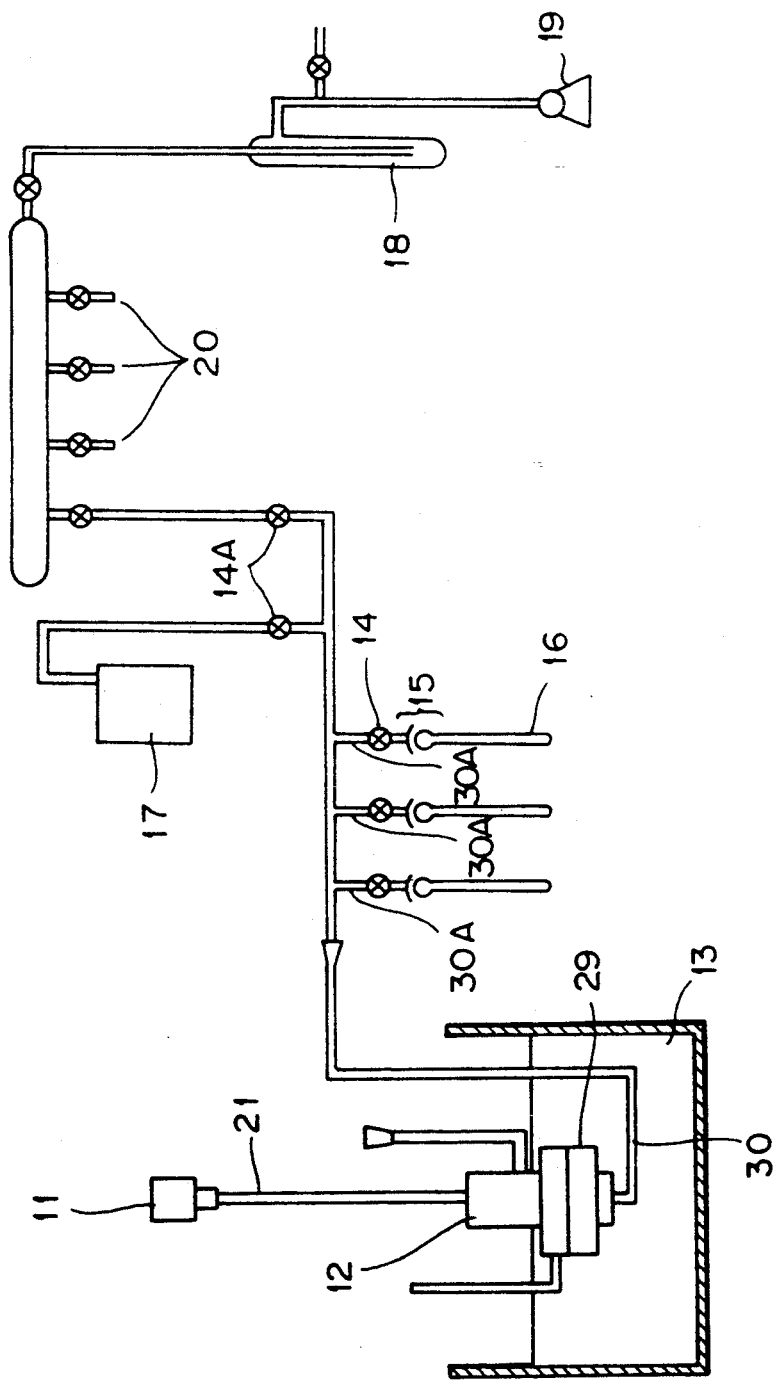
FIG. 3 is a schematic view showing the apparatus having a construction suitable for performing measurement of pervaporation using the water-organic solvent separation membrane according to the present invention.
Figure 4:
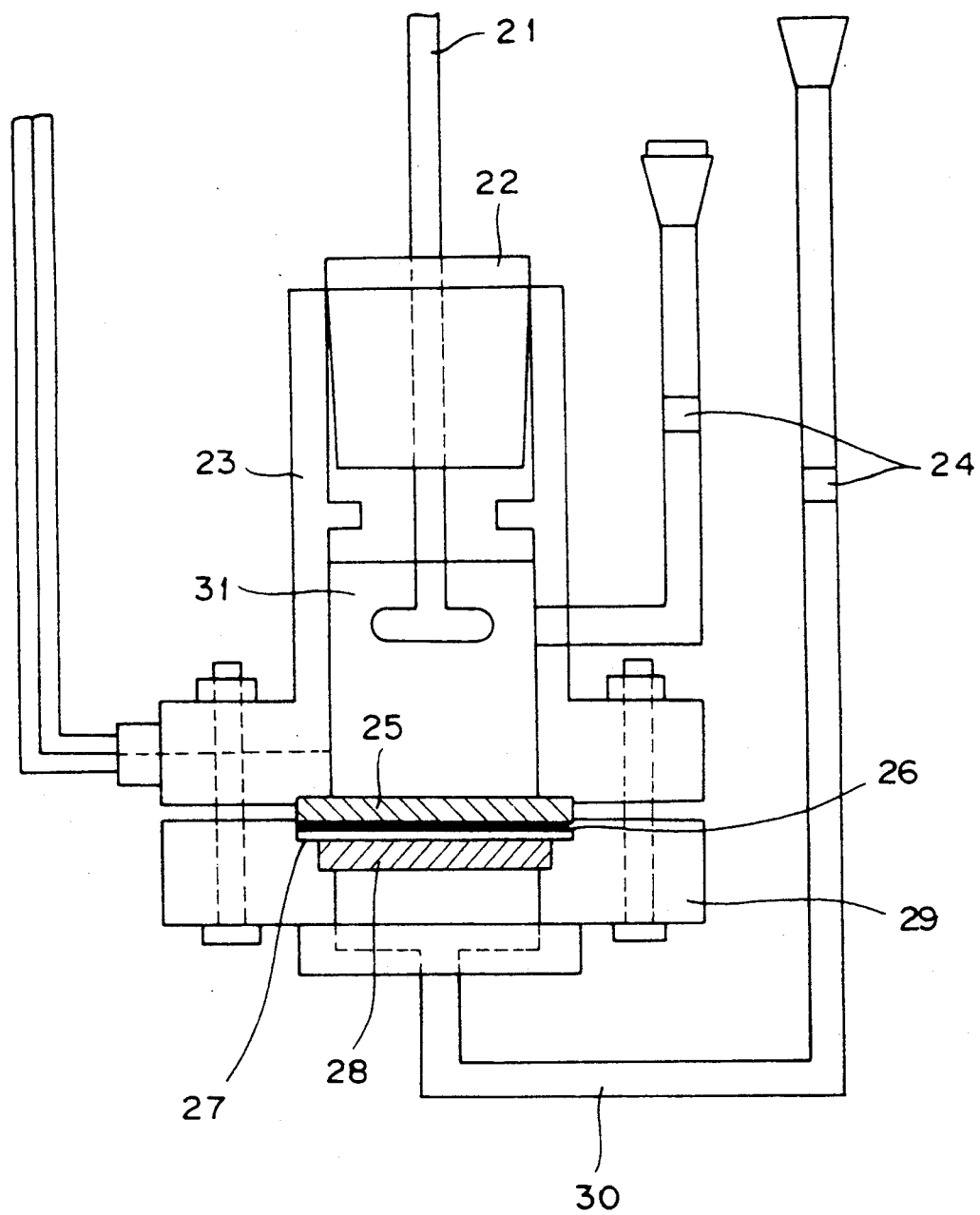
FIG. 4 is an enlarged cross-sectional view showing a pervaporation cell in the apparatus shown in FIG. 3.

FIG. 3 is a schematic view showing an apparatus having a construction suitable for performing measurement of pervaporation using the water-organic solvent separation membrane one embodiment of according to the present invention. FIG. 4 is an enlarged cross-sectional view showing a pervaporation cell in the apparatus shown in FIG. 3. Referring to FIGS. 3 and 4, the method of measuring pervaporation (hereafter, referred to as "PV") will be explained as follows.

In FIG. 3, reference numeral 11 denotes a motor for rotating a stirrer 21 provided in a pervaporation cell 12, and a temperature controlled bath 13 in which the pervaporation cell 12 is contained controls temperatures of the feed side and permeate side of the pervaporation cell 12 at constant levels. A plurality of cold traps 16 are each connected to a lower chamber 29 through a needle valve 14 provided with each pipe 30A branched from an outlet pipe 30 which is connected to an outlet of the lower chamber 29. Each of the cold traps 16 is connected through a frosted glass joint is to the needle valve 14. A vacuum gauge 17 and a cold trap 16 are connected to the outlet pipe 30 through the respective needle valves 14A such that the pipes 30A are connected to the outlet pipe 30 between the needle valves 14A and the outlet of the lower chamber 29. A cold trap 18 is connected to a vacuum pump 19. A plurality of pipes 20 (e.g., three pipes as shown in FIG. 3) are connected to the outlet pipe 30 between the cold trap 18 and the needle valve 14A in order to connect other measurement systems to the vacuum pump 19.

A feed liquid 31 is separated through a thin film 26 sandwiched by a solvent resistant gasket 25 made of fluorine-containing rubber, e.g., Viton gasket, trade name for a product by Tigers Polymer Co., and filter paper 27 as shown in FIG. 4. The filter paper 27 is a buffer between a metal plate 28 and the thin film 26 and may be replaced by a thin glass filter. The stirrer 21 is passed through a hole pierced through a stopper 22, e.g., Mighty Seal, trade name for a product by Fujiwara Seisakusho Co., Ltd., provided for preventing a solvent from evaporation.

The feed liquid 31 to be separated is poured into the feed side of the pervaporation cell 12, i.e., an upper chamber 23 of the cell 12 and stirred by the stirrer 21, and is permeated by reducing the pressure in the lower chamber 29 of the cell using the vacuum pump 19. The permeate is then collected by the cold traps 16 shown in FIG. 3.

After the collection, the weight of the sample (weight of the permeate liquid) is measured. On the other hand, the feed liquid 31 after the initiation of measurement for pervaporation and the permeate liquid are analyzed by gas chromatography to determine the compositions of the substance to be permeated and of the substance to be left unpermeated, respectively. The measurement of the thickness of the thin film 26 is performed before the initiation of the PV measurement. Separation factor, flux and permeation rate can be obtained by introducing results of these measurements into formulae (1), (2) and (3) above.

The swelling ratio of the membrane is measured as follows. That is, the membrane sandwiched by two pieces of Tetoron mesh or polyester-based synthetic fiber produced by Toray Industry is immersed in a solution which is adjusted to a predetermined concentration and left to stand in a temperature controlled bath. After standing it for 48 hours, the membrane is taken out from the solution and solution on the surface of the membrane is swept away with filter paper or the like and then the membrane is weighed. The weight thus obtained is defined as a weight at swelling or wet weight, Ww. This membrane is then dried in vacuum for no shorter than 48 hours and the membrane is weighed to obtain a dry weight, Wd. The swelling ratio W (%) of the membrane is calculated from the following formula (4):

$$W(\%) = \frac{Ww - Wd}{Wd} \times 100 \quad (4)$$

While the support used is in the form of a flat membrane in the above-described embodiment, particles or hollow fibers may also be used as the support.

FIGS. 5A to 5D are cross-sectional views each showing a procedure of producing a composite-type separation membrane according to the present invention when particles are used as a substrate for carrying the polymeric film for the separation of an organic solvent from a water-organic solvent mixture.

Figure 5:
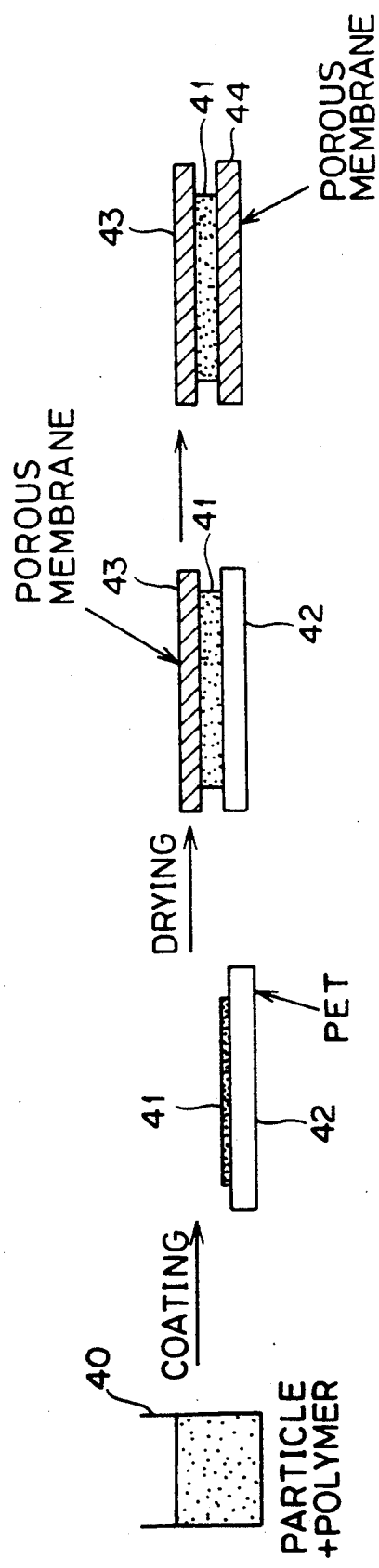
FIGS. 5A to 5D are cross-sectional views each showing a procedure of producing a composite-type separation membrane according to the present invention having a polymeric membrane and particles which are included therein.

As shown in FIG. 5A, particles having an adjusted particle size are immersed in a polymer solution in a vessel 40. As shown in FIG. 5B, a particle layer 41 is composed of the particles having coated on the surfaces thereof with the polymer solution and has a water-organic solvent separation ability so that water-organic solvent separation can be performed reliably without disintegration of the particle layer 41 into individual particles and scattering of the individual particles. The particle layer 41 is formed on a surface of a temporary support member 42 made of polyethylene terephthalate, for example. After drying, a porous membrane 43 is mounted on an exposed surface of the particle layer 41 as shown in FIG. 5C, and then the temporary support member 42 is removed from the particle layer 41. Another porous membrane 44 is substituted for the member 42 as shown in FIG. 5D.

The thus-obtained composite-type separation membrane has a sandwiched structure that the particle layer 41 is sandwiched by the two porous membranes 43 and 44.

FIGS. 6A to 6C are cross-sectional views each showing a procedure of producing a composite-type separation membrane according to the present invention when fibers are used as a support member for supporting the polymeric film for the separation of an organic solvent from a water-organic solvent mixture.

As shown in FIG. 6A, at first a plurality of fibers 50 are provided, immersed, for example, in the polymer solution in the vessel 40 shown in FIG. 5A and dried to coat the surfaces of fibers 50 with a polymeric membrane. Then, as shown in FIG. 6B, the surface-coated fibers 50 are arranged on a first porous membrane 51 to form a fiber layer. Next, a second porous membrane 52 is arranged on the fiber layer 50 to obtain a composite-type separation membrane as shown in FIG. 6C.

In the composite-type separation membrane thus obtained, the surface-coated fibers 50 having a water-organic solvent separation ability are sandwiched by the two porous membranes 51 and 52, which construction prevents the fibers from scattering so that water-organic solvent separation can be performed reliably.

FIGS. 7A to 7E are explanatory diagrams each showing a procedure of producing a composite-type separation membrane according to the present invention when hollow fibers in the form of a pipe or concentric cylinder are used as a support member for supporting the polymeric film for the separation of an organic solvent from a water-organic solvent mixture.

As shown in FIGS. 7A and 7B, a plurality of hollow fibers 60 are provided, immersed, for example, in the polymer solution in the vessel 40 shown in FIG. 5A and dried to coat the outer and inner surfaces of the hollow fibers 60 with a polymeric membrane. Next, the coated hollow fibers 60 are arranged on a first flat porous membrane 61 as shown in FIG. 7C. A second flat porous membrane 62 is then arranged on the hollow fibers 60 to obtain a composite-type separation membrane as shown in FIG. 7D. As shown in FIG. 7E, a module of such a composite-type separation membrane may be made by using an individual composite-type separation membrane as a unit and assembling a plurality of units.

In the composite-type separation membrane, the coated hollow fibers 60 having a water-organic solvent separation ability on the both outer and inner surfaces thereof are sandwiched by the two porous membranes 61 and 62, and this construction enables practicing the water-organic solvent separation reliably without scattering the hollow fibers 60. In addition, the hollow fibers 60 have a coated area much larger than the same weight of the fibers 50, the hollow fibers 60 have a water-organic solvent separation ability higher than that of the fibers 50.

FIG. 7F is an explanatory diagram showing a construction of the composite-type separation membrane in which the hollow fibers 60 are supported by a corrugated porous membrane 63 instead of the flat porous membranes 61 and 62. The hollow fibers 60 can be firmly fixed by determining the shape and size of the porous membrane 63 so that the hollow fibers 60 can be put in valley portions of the corrugated porous membrane 63 as shown in FIG. 7F. While FIG. 7F shows that a single follow fiber 60 is provided in each valley portion of the corrugated porous membrane 63, a plurality of the hollow fibers 60 may be arranged in each valley portion thereof.

The present invention will be explained in greater detail by way of examples. However, the present invention should not be construed as being limited thereto.

EXAMPLE 1

In a mixed solvent of toluene-ethyl acetate (toluene-:ethyl acetate = 1:20 by weight) were dissolved n-butyl acrylate (hereafter, referred to as "BA") and acrylic acid (hereafter, referred to as "AA") in a weight ratio of 31:3. To the resulting mixture was added azobisisobutyronitrile as a polymerization initiator to obtain a solution for polymerization. Radical polymerization of BA and AA in the solution was allowed to proceed at 70° C. for about 8 hours to obtain an acrylic acid ester.acrylic acid random copolymer. The copolymer had a weight average molecular weight of about 700,000 to 800,000.

Then, toluene was added to the above-described solution in such an amount that the content of the copolymer thus obtained became 25% by weight. Also, tetraglycidyl metaxylenediamine (TGXDA) was added to the solution as a crosslinking agent in such an amount that the proportion of the epoxy group/carboxyl group became 1/20. After well stirring it, the resulting mixture was coated on an exfoliative treated surface of a film having the thickness of 38 $\mu$m and being made of polyethylene terephthalate (hereafter, referred to as "PET"), dried at 80° C. for 5 minutes, and then applied on a porous polypropylene membrane having the thickness of 25 $\mu$m as a support member. Subsequently, only the PET film was exfoliated to obtain a polymer membrane having a film thickness of 60 to 90 $\mu$m. Further, a porous polypropylene membrane was applied on the polymer membrane to obtain a composite-type separation membrane.

Also, it was possible to use a polytetrafluoroethylene (Teflon, a registered trademark)-based porous membrane, a porous membrane of a fluororesin such as Fluoropore (trade name for a product by Sumitomo Electric Industries Co., Ltd.), or a porous cellulose acetate membrane usually employed as an ultrafiltration membrane instead of the porous polypropylene membrane serving as the support member.

Next, the composite-type separation membrane thus obtained was fitted as a thin film in the apparatus for measuring pervaporation as shown in FIGS. 3 and 4, and a mixed solution of water and 1,1,2-trichloroethane (hereafter, referred to as "TCE") at 25° C. was fed to the upper chamber of the pervaporation cell and the lower chamber of the cell was evacuated to a reduced pressure of from 0.05 to 0.5 mmHg, and separation of the mixed solution was performed by a pervaporation method to obtain the following results.

FIG. 8 is a graph illustrating a relationship between a concentration of TCE in the feed liquid and a concentration of TCE in the permeate liquid. The permeate liquid containing about 60% by weight of TCE was obtained from the feed liquid having a low TCE concentration, e.g., as low as 0.4% by weight. Because the solubility of TCE in water is 0.45 g/100 g (TCE/water), the resulting permeate liquid separated in two layers.

For TCE concentrations of 0.018, 0.13, 0.24 and 0.41% by weight, permeation rates were 1.08, 1.21, 1.81 and 2.73 ($\times 10^{-6}$ kg·m/m$^2$·hr), respectively, and separation factors were 629, 373, 379 and 467, respectively.

FIGS. 9 and 10 illustrate relationships between a change in a concentration of TCE and a separation factor and total flux, respectively, of the membrane. Curve A in FIG. 9 represents a change in a separation factor and curve B in FIG. 10 represents a change in a total flux.

As will be apparent from curve A in FIG. 9, the separation factors at low concentrations are about twice as high as the separation factors in other concentration ranges. The separation factor obtained by the PV method is expressed in terms of a valve which is obtained by dividing the composition ratio of the respective components in the permeate liquid by that of the respective components in the feed liquid, resulting in that a slight change in the concentration of either one substance gives rise to a fluctuation in the separation factor to a greater extent when that substance is contained at a low concentration. In addition, there is a possibility that fluctuation of the separation factor increases depending on decreased detection accuracy of gas chromatography at low concentrations. Permeation rate is calculated by multiplying the flux illustrated by curve B in FIG. 10 with the thickness of the membrane.

FIG. 11 illustrates a relationships between a concentration of TCE in the feed liquid and a flux of TCE, that of water, and total flux. These were indicated separately for different components of the permeate liquid in order to illustrate that the total flux and separation factor increase with increase in the concentration of TCE in the feed liquid as illustrated in FIGS. 9 and 10. In FIG. 11, curves C, D and E represent changes in the flux of TCE, that of water, and total flux, respectively.

Curve D demonstrates that the change in the concentration of the feed liquid resulted in substantially no change in the flux of water. Curve C demonstrates that the flux of TCE changed several times according as the concentration of the feed liquid changed. It would be because the formula for calculating fluxes contains terms dependent on the concentrations of respective components that the fluxes change as illustrated in curves C and E. Also, the separation factors would be considered to increase according as the proportion of TCE in the permeate liquid increases as a result of the increased flux of TCE against the flux of water being kept constant.

The permeate liquid separated into two layers, and permeation rates for TCE were each 1.81, 3.90, 8.74 and 18.0 ($\times 10^{-7}$ kg·m/m$^2$·hr).

EXAMPLE 2

PV measurement was performed on the separation membrane used in Example 1 at temperatures of 40° C., 55° C. or 70° C., and the following results were obtained.

At a measurement temperature of 40° C. and at a TCE concentration in the feed liquid of 0.17% by weight, the permeation rate was 3.08 ($\times 10^{-6}$ kg·m/m$^2$·hr) and separation factor ($\alpha$) for water was 316. Similarly, at 55° C. and at 0.14% by weight, the permeation rate was 6.56 ($\times 10^{-6}$ kg·m/m$^2$·hr) and the separation factor ($\alpha$) 239; and at 70° C. and at 0.15% by weight, the permeation rate was 1.44 ($\times 10^{-5}$ kg·m/m$^2$·hr) and the separation factor ($\alpha$) 145. The permeate liquid separated into two layers, and the permeation rates of TCE at 40° C., 55° C. and 70° C. were 1.12, 1.64 and 2.49 ($\times 10^{-6}$ kg·m/m$^2$·hr), respectively. FIG. 12 illustrates a relationships between a temperature and a flux of TCE, that of water and total flux, respectively. In FIG. 12, curves F, G and H represent changes in the flux of TCE, that of water, and total flux, respectively. As indicated by curve F, the flux of TCE changes proportionally to the change in the temperature while the flux of water increases exponentially as the temperature increases as indicated by curve G. As a result, total flux changes greatly according as the temperature changes as indicated curve H.

EXAMPLE 3

PV measurement was performed using a separation membrane obtained by the same procedures as in Example 1 except that n-butyl acrylate in Example 1 was replaced by lauryl methacrylate (LaMA), and the following results were obtained. The thickness and film area of the membrane were the same as in Example 1.

At 25° C. and at a TCE concentration of 0.19% by weight, the permeation rate was 6.66 ($\times 10^{-7}$ kg·m/m$^2$·hr), and the separation factor ($\alpha$) of TCE for water was 2,264. The permeate liquid was obtained in two separate layers. The permeation rate of TCE was 5.24 ($\times 10^{-7}$ kg·m/m$^2$·hr).

COMPARATIVE EXAMPLE 1

PV measurement was performed at 25° C. using a polystyrene film having a thickness of 42 $\mu$m, and the following results were obtained.

At a TCE concentration of 0.21% by weight, the permeation rate was 2.05 ($\times 10^{-8}$ kg·m/m$^2$·hr). The TCE in the permeate liquid was below detection limit, and hence it was impossible to calculate the separation factor.

COMPARATIVE EXAMPLE 2

PV measurement was performed at 25° C. using a low density polyethylene film having a thickness of 15 $\mu$m, and the following results were obtained.

At a TCE concentration of 0.18% by weight, the permeation rate was 5.10 ($\times 10^{-8}$ kg·m/m$^2$·hr). The separation factor of TCE for water was 3,629. The permeation rate of TCE in the permeate liquid was 4.50 ($\times 10^{-8}$ kg·m/m$^2$·hr).

COMPARATIVE EXAMPLE 3

PV measurement was performed at 25° C. using a polyvinyl chloride film having a thickness of 62 $\mu$m, and the following results were obtained.

At a TCE concentration of 0.20% by weight, the permeation rate was 2.18 ($\times 10^{-8}$ kg·m/m$^2$·hr). The TCE in the permeate liquid was below detection limit, and hence it was impossible to calculate the separation factor like Comparative Example 1.

Table 1 shows results of measurements obtained in Examples 1 to 3 and Comparative Examples 1 to 3 and Table 2 shows results of measurements obtained in Examples 4 to 8.

In Examples 1 to 3 and Comparative Example 1 to 3, the feed liquid was a water-TCE mixture. In Example 4, a water-ethyl acetate mixture was used as the feed liquid. In Examples 5, 6, 7, and 8, the feed liquid used were a water-chloroform mixture, a water-EDC mixture, a water-trichlene mixture, and a water-perclene mixture, respectively.

TABLE 1

| | Concentration of Organic Solvents in feed (wt %) | Temperature (°C.) | Permeation Rate (kg · m/m$^2$ · hr) | Separation Factor ($\alpha$) | Permeation Rate × $\alpha$ (kg · m/m$^2$ · hr) |
|---|---|---|---|---|---|
| Example 1 | 0.018 | 25 | 1.08 × 10$^{-6}$ | 629 | 6.79 × 10$^{-4}$ |
| | 0.13 | 25 | 1.21 × 10$^{-6}$ | 373 | 4.51 × 10$^{-4}$ |
| | 0.24 | 25 | 1.81 × 10$^{-6}$ | 379 | 6.86 × 10$^{-4}$ |
| | 0.41 | 25 | 2.73 × 10$^{-6}$ | 467 | 1.27 × 10$^{-3}$ |
| Example 2 | 0.17 | 40 | 3.08 × 10$^{-6}$ | 316 | 9.73 × 10$^{-4}$ |
| | 0.14 | 55 | 6.56 × 10$^{-6}$ | 539 | 1.57 × 10$^{-3}$ |
| | 0.15 | 70 | 1.44 × 10$^{-6}$ | 145 | 2.09 × 10$^{-3}$ |

TABLE 1-continued

|  | Concentration of Organic Solvents in feed (wt %) | Temperature (°C.) | Permeation Rate (kg · m/m² · hr) | Separation Factor (α) | Permeation Rate × α (kg · m/m² · hr) |
| --- | --- | --- | --- | --- | --- |
| Example 3 | 0.19 | 25 | $6.66 \times 10^{-7}$ | 2264 | $1.51 \times 10^{-3}$ |
| Comparative 1 | 0.21 | 25 | $2.05 \times 10^{-8}$ | — | — |
| Comparative 2 | 0.18 | 25 | $2.05 \times 10^{-8}$ | 3629 | $1.85 \times 10^{-4}$ |
| Comparative 3 | 0.20 | 25 | $2.18 \times 10^{-8}$ | — | — |

As will be clearly understood from Table 1, the value of (permeation rate × α) is greater in Examples 1 to 3 than in Comparative Examples 1 to 3, thus demonstrating that the separation membranes obtained in the Examples have high enough permeabilities superior to the Comparative Examples.

After the permeation of the organic solvent, the concentration of the organic solvent remaining in the feed liquid was within the range of 0.05 to 0.08% by weight (the initial concentration on the side of the feed liquid: 0.2% by weight, after continuing the measurement for 3 hours), which reveals that the organic solvent in the water-organic solvent mixtures can be recovered efficiently and water can be purified satisfactorily.

EXAMPLE 4

Separation by the pervaporation method was performed at 25° C. using the same separation membrane (BA-AA) as used in Example 1 with feeding a mixed solution of water-ethyl acetate, and the following results were obtained.

When the concentration of ethyl acetate in the aforementioned mixed solution was 0.162, 2.14, 5.33, or 7.33% by weight, the permeation rate of the mixed solution was 0.0998, 0.245, 1.25, or 2.34 ($\times 10^{-5}$ kg·m/m²·hr), respectively; and the separation factor (α) of ethyl acetate for water was 29.1, 59.3, 123, or 96.3, respectively. The permeate liquid was obtained in two separate layers, and the permeation rate of ethyl acetate was 0.00445, 0.138, 1.09 or 2.07 ($\times 10^{-5}$ kg·m/m²·hr). Based on these results, FIG. 13 illustrates the effect of feed composition on the permeate concentration; FIG. 14 illustrates the effect of feed concentration on the separation factor of ethyl acetate-water mixture; and FIG. 15 illustrates the effect of feed concentration on the flux of ethyl acetate-water mixture.

EXAMPLE 5

Separation by the pervaporation method was performed at 25° C. using the same separation membrane (BA-AA) as used in Example 1 with feeding a mixed solution of water-chloroform, and the following results were obtained.

When the concentration of chloroform in the aforementioned mixed solution was 0.0807, 0.155 or 0.470% by weight, the permeation rate of the mixed solution was 0.811, 1.07 or 2.32 ($\times 10^{-6}$ kg·m/m²·hr), respectively; and the separation factor (α) of chloroform for water was 433, 467 or 758, respectively. The permeation rate of chloroform in the permeate liquid was 0.210, 0.450 or 1.81 ($\times 10^{-6}$ kg·m/m²·hr). Based on these results, FIG. 16 illustrates the effect of feed concentration on the permeate concentration; FIGS. 17 and 18 illustrate the effects of feed concentration on the separation factor and flux, respectively.

EXAMPLE 6

Separation by the pervaporation method was performed at 25° C. using the same separation membrane (BA-AA) as used in Example 1 with feeding a mixed solution of water-1,2-dichloroethane (ethylene dichloride (EDC)), and the following results were obtained.

When the concentration 1,2-dichloroethane in the aforementioned mixed solution was 0.0922, 0.175, or 0.500% by weight, the permeation rate of the mixed solution was 1.32, 1.70, or 3.43 ($\times 10^{-6}$ kg·m/m²·hr), respectively; and the separation factor (α) of 1,2-dichloroethane for water was 246, 320, or 441, respectively. The permeation rate of 1,2-dichloroethane in the permeate liquid was 0.243, 0.611, or 2.36 ($\times 10^{-6}$ kg·m/m²·hr). Based on these results, FIG. 19 illustrates the effect of feed concentration on the permeate concentration; FIGS. 20 and 21 illustrate the effect of feed concentration on the separation factor and flux, respectively.

EXAMPLE 7

Separation by the pervaporation method was performed at 25° C. using the same separation membrane (BA-AA) as used in Example 1 with feeding a mixed solution of water-trichloroethylene (hereafter, referred to as "trichlene"), and the following results were obtained.

When the concentration of trichlene in the aforementioned mixed solution was 0.0160, 0.0297, 0.0529, or 0.0798% by weight, the permeation rate of the mixed solution was 1.15, 1.25, 1.46, or 1.53 ($\times 10^{-6}$ kg·m/m²·hr), respectively; and the separation factor (α) of trichlene for water was 833, 804, 804, or 838, respectively. The permeation rate of trichlene in the permeate liquid was 0.135, 0.240, 0.436, or 0.614 ($\times 10^{-6}$ kg·m/m²·hr). Based on these results, FIG. 22 illustrates the effect of feed concentration on the permeate concentration; FIGS. 23 and 24 illustrate the effects of feed concentration on the separation factor and flux, respectively.

EXAMPLE 8

Separation by the pervaporation method was performed at 25° C. using the same separation membrane (BA-AA) as used in Example 1 with feeding a mixed solution of water-tetrachloroethylene (hereafter, referred to as "perclene"), and the following results were obtained.

When the concentration of perclene in the aforementioned mixed solution was 11.2, 35.3, 65.2, or 92.4 ppm, the permeation rate of the mixed solution was 10.0, 9.03, 9.75, or 9.94 ($\times 10^{-7}$ kg·m/m²·hr), respectively; and the separation factor (α) of perclene for water was 2,682, 1,177, 905, or 977, respectively. The permeation rate of perclene in the permeate liquid was 0.290, 0.359, 0.543, 0.824 ($\times 10^{-7}$ kg·m/m²·hr). Based on these results, FIG. 25 illustrates the effect of feed concentration on the permeate concentration; FIGS. 26 and 27 illustrate the effects of feed concentration on the separation factor and flux, respectively.

227.4° K., and LaMA-AA had a Tg of 216.5° K. The rest three types of membranes had each a Tg no lower than about room temperature.

TABLE 2

| | Concentration of Organic Solvents in feed (wt %) | Temperature (°C.) | Permeation Rate (kg · m/m² · hr) | Separation Factor (α) | Permeation Rate × α (kg · m/m² · hr) |
|---|---|---|---|---|---|
| Example 4 | 0.162 | 25 | $0.0998 \times 10^{-5}$ | 29.1 | $2.90 \times 10^{-5}$ |
| | 2.14 | 25 | $0.245 \times 10^{-5}$ | 59.3 | $1.45 \times 10^{-4}$ |
| | 5.33 | 25 | $1.25 \times 10^{-5}$ | 123 | $1.54 \times 10^{-3}$ |
| | 7.33 | 25 | $2.34 \times 10^{-5}$ | 96.3 | $2.25 \times 10^{-3}$ |
| Example 5 | 0.0887 | 25 | $0.811 \times 10^{-6}$ | 433 | $3.51 \times 10^{-4}$ |
| | 0.155 | 25 | $1.07 \times 10^{-6}$ | 467 | $5.00 \times 10^{-4}$ |
| | 0.470 | 25 | $2.32 \times 10^{-6}$ | 758 | $1.76 \times 10^{-3}$ |
| Example 6 | 0.0922 | 25 | $1.32 \times 10^{-6}$ | 246 | $3.25 \times 10^{-4}$ |
| | 0.175 | 25 | $1.70 \times 10^{-6}$ | 320 | $5.44 \times 10^{-4}$ |
| | 0.500 | 25 | $3.43 \times 10^{-6}$ | 441 | $1.51 \times 10^{-3}$ |
| Example 7 | 0.0160 | 25 | $1.15 \times 10^{-6}$ | 833 | $9.58 \times 10^{-4}$ |
| | 0.0297 | 25 | $1.25 \times 10^{-6}$ | 804 | $1.01 \times 10^{-3}$ |
| | 0.0529 | 25 | $1.46 \times 10^{-6}$ | 804 | $1.17 \times 10^{-3}$ |
| | 0.0798 | 25 | $1.53 \times 10^{-6}$ | 838 | $1.28 \times 10^{-3}$ |
| Example 8 | 11.2 (ppm) | 25 | $10.0 \times 10^{-7}$ | 2682 | $2.68 \times 10^{-3}$ |
| | 35.3 (ppm) | 25 | $9.03 \times 10^{-7}$ | 1177 | $1.06 \times 10^{-3}$ |
| | 65.2 (ppm) | 25 | $9.75 \times 10^{-7}$ | 905 | $8.82 \times 10^{-4}$ |
| | 92.4 (ppm) | 25 | $9.95 \times 10^{-7}$ | 977 | $9.72 \times 10^{-4}$ |

EXAMPLE 9

Copolymers with acrylic acid (AA) were prepared by repeating the same procedures as in Example 1 except that n-butyl acrylate (BA) used in Example 1 was replaced by t-butyl acrylate (tert-BA), cyclohexyl acrylate (CHA) or benzyl acrylate (BeA), and separation membranes were made using the copolymers thus obtained. Various measurements were made in order to compare the thin films made of the copolymers were compared with the thin films BA-AA and LaMA-AA in Examples 1 and 3, respectively. Results obtained are shown in Table 3.

While it is considered that generally membranes having lower permeation rates have higher separation factors, tert-BA-AA membrane, CHA-AA membrane and BeA-AA membrane have low separation factors despite the fact that they have low permeation rates. This would be considered due to the fact that these membranes each have a relatively higher Tg than BA-AA membrane and LaMA-AA membrane.

The swelling ratios were calculated from the formula (4) above. It reveals that the higher the permeation rate, the higher the swelling ratio.

EXAMPLE 10

TABLE 3

| Thin Film | Feed Concentration TCE (wt %) | α (TCE/water) | Permeation Rate (× $10^{-7}$ kg · m/m² · hr) | Swelling Ratio | Thickness (μm) |
|---|---|---|---|---|---|
| BA-AA | 0.170 | 485 | 15.7 | 14.44 | 65.6 |
| LaMA-AA | 0.193 | 2264 | 6.52 | 10.25 | 47.6 |
| tert-BA-AA | 0.182 | 8.20 | 3.76 | 6.485 | 74.0 |
| CHA-AA | 0.186 | 31.0 | 2.17 | 8.198 | 59.6 |
| BeA-AA | 0.201 | 108 | 5.05 | 8.681 | 79.2 |

Because membranes used have different thicknesses, in the case that the membranes become thick, the diffusion resistance is increased and accordingly the permeation of substances in the membranes becomes to be reduced. The flux is represented by the amount of the permeation per a unit of period or area and accordingly, when membranes have different thicknesses, the different results and obtained even through the membranes are made of the same materials. In the case that the membranes have different thicknesses and that the differences are not considered, it cannot be judged that the side chain of polymers as materials for the membranes serves to cause differences of the permeation of the membranes or the thicknesses of the membranes serve to do so. Hence, corrected permeation rates were shown which were obtained after correction by multiplying each flux with each thickness. Higher permeation rates of BA-AA and LaMA-AA membranes than the rest three types of membranes would be ascribable to their glass transition temperatures (Tg) being lower than the rest three. BA-AA membrane had a Tg of A separation membrane was prepared in the same procedures as in Example 1 except that the weight proportion of comonomers in the copolymer was changed to BA:AA=97:3 by weight, and PV measurement was carried out using the resulting membrane to obtain the following results.

At 25° C. and at a TCE concentration of 0.199% by weight, the permeation rate was 1.97 ($\times 10^{-6}$ kg·m/m²·hr), and the separation factor of TCE for water was 731. Further, the permeation rate of TCE in the permeate liquid was 1.17 ($\times 10^{-6}$ kg·m/m²·hr).

EXAMPLE 11

A separation membrane was prepared in the same procedures as in Example 1 except that the comonomers in Example 1 were replaced by n-butyl acrylate (BA):methyl acrylate (MA):2-hydroxyethyl acrylate (HEA)=60:30:10 by weight, and the crosslinking agent used in Example 1 was replaced by trimethylolpropane adduct toluylenediisocyanate (TMPTDI) (isocyanate group/hydroxyl group=1/20), and PV measurement was carried out using the resulting membrane to obtain the following results.

At 25° C. and at a TCE concentration of 0.207% by weight, the permeation rate was 2.47 ($\times 10^{-6}$ kg·m/m²·hr), and the separation factor of TCE for water was 473. Further, the permeation rate of TCE in the permeate liquid was 1.22 ($\times 10^{-6}$ kg·m/m²·hr).

EXAMPLE 12

A separation membrane was prepared in the same procedures as in Example 1 except that the comonomers in Example 1 were replaced by BA:MA:HEA=83:10:7 by weight, and the crosslinking agent used in Example 1 was replaced by TMPTDI (isocyanate group/hydroxyl group=1/20), and PV measurement was carried out using the resulting membrane to obtain the following results.

At 25° C. and at a TCE concentration of 0.199% by weight, the permeation rate was 2.56 ($\times 10^{-6}$ kg·m/m²·hr), and the separation factor of TCE for water was 639. Further, the permeation rate of TCE in the permeate liquid was 1.43 ($\times 10^{-6}$ kg·m/m²·hr).

EXAMPLE 13

A separation membrane was prepared in the same procedures as in Example 1 except that the comonomers in Example 1 were replaced by n-butyl acrylate (BA):methyl methacrylate (MMA):2-hydroxyethyl acrylate (HEA)=78:15:7 by weight, and the crosslinking agent used in Example 1 was replaced by trimethylolpropane adduct toluylenediisocyanate (TMPTDI) (isocyanate group/hydroxyl group=1/20), and PV measurement was carried out using the resulting membrane to obtain the following results.

At 25° C. and at a TCE concentration of 0.196% by weight, the permeation rate was 2.32 ($\times 10^{-6}$ kg·m/m²·hr), and the separation factor of TCE for water was 667. Further, the permeation rate of TCE in the permeate liquid was 1.32 ($\times 10^{-6}$ kg·m/m²·hr).

Table 4 shows experimental results on the separation membranes obtained in Examples 10 to 13.

material and can be formulated into a composite therewith.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A membrane for separating an organic solvent from a water-organic solvent mixture, comprising a polymeric membrane of a copolymer consisting essentially of an $\alpha,\beta$-unsaturated carbonyl compound as a main monomer wherein said polymeric membrane is effective for separating an organic solvent from a water-organic solvent mixture.

2. A membrane as claimed in claim 1, wherein said $\alpha,\beta$-unsaturated carbonyl compound is an acrylic acid ester or a methacrylic acid ester.

3. A membrane as claimed in claim 1, wherein said polymer has a reactive functional group which can be crosslinked with a crosslinking agent.

4. A membrane as claimed in claim 3 wherein said reactive functional group of said copolymer is selected from the group consisting of a carboxyl group, a hydroxyl group, a glycidyl group and an amino group.

5. A membrane as claimed in claim 3, wherein said crosslinking agent is selected from the group consisting of a polyisocyanate, a melamine resin, an epoxy resin, a metal chelate, a polyvalent metal and a polyamine.

6. A membrane as claimed in claim 1, further comprising a support member for supporting said polymeric membrane.

7. A membrane as claimed in claim 6, wherein said support member is in the form of a flat membrane.

8. A membrane as claimed in claim 6, wherein said polymeric membrane is arranged on the surface of at least one pipe as said support member.

9. A membrane as claimed in claim 8, wherein said pipe is a concentric cylinder.

TABLE 4

| | Thin Film | Feed Concentration TCE (wt %) | α (TCE/water) | R ($\times 10^{-6}$ kg · m/m² · hr) | R × α ($\times 10^{-3}$ kg · m/m² · hr) |
|---|---|---|---|---|---|
| Example 10 | BA-AA (97:3) | 0.199 | 731 | 1.97 | 1.44 |
| Example 11 | BA-MA-HEA (60:30:10) | 0.207 | 473 | 2.47 | 1.17 |
| Example 12 | BA-MA-HEA (83:10:7) | 0.199 | 639 | 2.56 | 1.64 |
| Example 13 | BA-MMA-HEA (78:15:7) | 0.196 | 667 | 2.32 | 1.55 |

As described in the foregoing, the separation membrane of the present invention have the following effects.

(1) It has a high enough separability due to the use of acrylic acid ester and methacrylic acid ester which have affinity for organic solvents.

(2) It can purify water and enables reuse of organic substances because it can separate organic solvents from water efficiently.

(3) It can easily be formed in the form of a thin film on a substrate such as porous membrane, for example, by coating.

(4) It can be formed in the form of a thin film even on polydimethylsiloxane generally used as a separation 10. A membrane as claimed in claim 6, wherein said polymeric membrane is coated on the surface of hollow fibers as said support member.

11. A membrane as claimed in claim 6, wherein said support member is supported on a porous membrane.

12. A membrane as claimed in claim 1, wherein said polymeric membrane includes particles therein.

13. A membrane as claimed in claim 12, wherein said polymeric membrane is supported on a porous member.

14. A composite-type separation membrane for separating an organic solvent from a water-organic solvent mixture, comprising a polymeric membrane of copolymer consisting essentially of an $\alpha,\beta$-unsaturated carbonyl compound as a main monomer, and at least one support member which is arranged on said polymeric membrane, wherein said polymeric membrane is effective for separating an organic solvent from a water-organic solvent mixture.

15. A membrane according to claim 1, wherein the polymeric membrane is effective for separating an organic solvent from a water-organic solvent mixture wherein the organic solvent is present in a low concentration.

16. A membrane according to claim 2, wherein said acrylic acid ester or said methacrylic acid ester comprises a hydrocarbon-based group which has a high affinity for a specific organic solvent.

17. A membrane according to claim 16, wherein said hydrocarbon-based group is selected from the group consisting of an n-butyl group, a tert-butyl group, a benzyl group, and a dodecyl group.

18. A membrane according to claim 16, wherein said polymer is crosslinked by a crosslinking agent comprising tetraglycidyl metaxylenediamine.

19. A process for separating an organic solvent from a liquid mixture containing the organic solvent, comprising: providing a membrane comprising a polymeric membrane of a copolymer consisting essentially of an $\alpha,\beta$-unsaturated carbonyl compound as a main monomer, and feeding a liquid mixture containing an organic solvent to be separated to one side of said membrane.

20. A process according to claim 19, wherein said liquid mixture containing an organic solvent to be separated is selected from the group consisting of an azeotropic mixture, an isomeric mixture, industrial waste water, underground water, a solution with an organic solvent in low concentration, and a solution with an organic solvent having a high boiling point.

21. A process according to claim 19, further comprising, subsequent to the feeding step, evacuating the other side of the membrane by aspiration to have a compound permeate through the membrane and collecting the permeate component.

* * * * *